(12) United States Patent
Kim et al.

(10) Patent No.: US 11,868,702 B2
(45) Date of Patent: *Jan. 9, 2024

(54) SCOPED CONTAINERS USING CSS CUSTOM PROPERTIES AND COLOR PAIRS

(71) Applicant: salesforce.com, inc., San Francisco, CA (US)

(72) Inventors: Kyung Jin Kim, Burnaby (CA); Shelby Hubick, Toronto (CA); Bret Little, San Francisco, CA (US); Andrew Peterson, Somerville, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,853

(22) Filed: Oct. 19, 2022

(65) Prior Publication Data

US 2023/0066832 A1 Mar. 2, 2023

Related U.S. Application Data

(63) Continuation of application No. 17/302,860, filed on May 13, 2021, now Pat. No. 11,507,729.

(51) Int. Cl.
*G06F 17/00* (2019.01)
*G06F 40/117* (2020.01)
(Continued)

(52) U.S. Cl.
CPC .......... *G06F 40/117* (2020.01); *G06F 3/0482* (2013.01); *G06F 3/04845* (2013.01);
(Continued)

(58) Field of Classification Search
None
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Mustafa A Amin
(74) *Attorney, Agent, or Firm* — Weaver Austin Villeneuve & Sampson LLP

(57) ABSTRACT

A computer-implemented method and corresponding systems and apparatuses for configuring the visual appearance of a webpage. The method involves providing access to color schemes through a user interface of a software application and assigning color schemes to corresponding sections of the webpage based on user input. Each color scheme includes at least one foreground color paired with a corresponding background color that contrasts the foreground color. The method further involves generating source code representing the webpage. In some examples, the source code includes a first container corresponding to a first section and a second container corresponding to a second section. The first container includes properties corresponding to a first color scheme. Similarly, the second container includes properties corresponding to a second color scheme. Because the second section is a subsection of the first section, the source code is generated with the second container being nested within the first container.

20 Claims, 15 Drawing Sheets

(51) Int. Cl.
  *G06F 40/14* (2020.01)
  *G06F 3/04845* (2022.01)
  *G06F 9/445* (2018.01)
  *G06T 11/00* (2006.01)
  *G06F 8/30* (2018.01)
  *G06F 3/0482* (2013.01)

(52) U.S. Cl.
  CPC ............ *G06F 8/30* (2013.01); *G06F 9/44526* (2013.01); *G06F 40/14* (2020.01); *G06T 11/001* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,104,391 A * | 8/2000 | Johnston, Jr. ......... G06F 3/0481 715/745 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,025,763 B2 * | 7/2018 | Wang .................... G06F 40/117 |
| 10,282,401 B2 * | 5/2019 | Scoda ................. G06F 16/9577 |
| 10,546,039 B1 * | 1/2020 | Van Rotterdam ... G06F 16/9577 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |

(56) References Cited

U.S. PATENT DOCUMENTS

| | | |
|---|---|---|
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0031213 A1* | 1/2009 | Goldenberg .......... G06T 11/001 |
| | | 715/235 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0019572 A1* | 1/2012 | Lim ....................... G09G 5/026 |
| | | 345/690 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0111324 A1* | 5/2013 | Kern .................... G06F 40/117 |
| | | 715/230 |
| 2013/0207988 A1* | 8/2013 | Artigue .................. G06F 9/451 |
| | | 345/589 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246909 A1* | 9/2013 | Carroll .................. G06F 40/143 |
| | | 715/235 |
| 2013/0247216 A1 | 9/2013 | Cinarkaya et al. |
| 2013/0321445 A1* | 12/2013 | Buerner ................ G06F 9/451 |
| | | 345/589 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0070813 A1* | 3/2016 | Unter Ecker ......... G06F 16/958 |
| | | 715/234 |
| 2017/0371848 A1* | 12/2017 | Roessler ............... G06F 40/154 |
| 2018/0293323 A1* | 10/2018 | Abrahami ............... G06F 15/76 |
| 2020/0372206 A1* | 11/2020 | Fialkow ............... G06F 16/986 |
| 2021/0248304 A1* | 8/2021 | Olivier ................. G06F 40/106 |

OTHER PUBLICATIONS

U.S. Non-Final office Action dated Apr. 28, 2022 in U.S. Appl. No. 17/302,860.

U.S. Notice of Allowance dated Jul. 20, 2022 in U.S. Appl. No. 17/302,860.

* cited by examiner

Metadata
800

802
```
[
  {
    "id": "BackgroundColor",
    "tokens": [
        "--dxp-g-root"
    ],
    "label": "Background Color",
    "type": {
        "name": "Color"
    },
    "field": "color",
    "value": "#ffffff"
  },
```

⋮

804
```
  {
    "id": "_TextColor",
    "tokens": [
        "--dxp-g-root-contrast"
    ],
    "label": "Text Color",
    "type": {
        "name": "Color"
    },
    "field": "color",
    "value": "#1a1b1e"
  },
```

⋮

806
```
  {
    "id": "PrimaryAccentColor",
    "tokens": [
        "--dxp-g-brand"
    ],
    "label": "Primary Accent Color",
    "type": {
        "name": "Color"
    },
    "field": "color",
    "value": "#005fb2"
  },
```

⋮

808
```
  {
    "id": "PrimaryAccentForegroundColor",
    "tokens": [
        "--dxp-g-brand-contrast"
    ],
    "label": "Primary Accent Foreground Color",
    "type": {
        "name": "Color"
    },
    "field": "color",
    "value": "#ffffff"
  }
```

CSS code
810

```
:root {
    --dxp-g-root: #ffffff;
    --dxp-g-root-contrast: #1a1b1e;
    --dxp-g-root-contrast-1: #000000;
    --dxp-g-root-contrast-2: #000000;
    ⋮
    --dxp-g-brand: #005fb2;
    --dxp-g-brand-contrast: #ffffff;
    ⋮
    --dxp-g-warning: #ffb75d;
    --dxp-g-warning-contrast: #000000;
    ⋮
    --dxp-g-success: #4bca81;
    --dxp-g-success-contrast: #000000;
    ⋮
    --dxp-g-info: #16325c;
    --dxp-g-info-contrast: #ffffff;
    ⋮
    --dxp-g-neutral: #ecebea;
    --dxp-g-neutral-contrast: #000000;
    ⋮
    --dxp-g-destructive: #c23934;
    --dxp-g-destructive-contrast: #ffffff;
    ⋮
    --dxp-s-text-heading-medium-letter-spacing: 0em;
    --dxp-s-text-heading-small-text-decoration: none;
    --dxp-s-text-heading-extra-large-line-height: 1.25;
    --dxp-s-body-font-size: 1rem;
    --dxp-s-body-small-text-decoration: none;
    --dxp-s-text-heading-large-line-height: 1.25;
    --dxp-s-text-heading-medium-text-transform: none;
    --dxp-s-button-font-size: 1rem;
    --dxp-s-button-letter-spacing: 0em;
    --dxp-s-link-text-decoration: none;
    --dxp-s-link-text-decoration-hover: underline;
    ⋮
}
```

812 braces the first group of properties; 814 braces the second group.

FIG. 8B

SCOPED CONTAINERS USING CSS CUSTOM PROPERTIES AND COLOR PAIRS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates generally to configuring the visual appearance of web documents and more specifically to techniques for generating source code for a webpage, where the source code includes containers that represent different sections of the webpage.

BACKGROUND

Modern web sites are often the product of work contributed by different users with varying levels of web design expertise. For instance, a webpage may be generated by a site creator using software that provides a graphical user interface for building the page in a non-programmatic manner and without requiring the site creator to be knowledgeable about HyperText Markup Language (HTML) or other web document languages. The software may allow the site creator to configure a general color scheme that is limited in scope, e.g., a site-wide scope covering a background color and a contrast color for text rendered against the background. The software may also allow the site creator to add to the site components (e.g., radio buttons, dropdown lists, and the like) that are created by component authors who may or may not be part of the same organization as the site creator.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

FIG. 8A shows an example of metadata according to some implementations.

FIGS. 8B and 8C show examples of CSS code according to some implementations.

DETAILED DESCRIPTION

Figure 1:
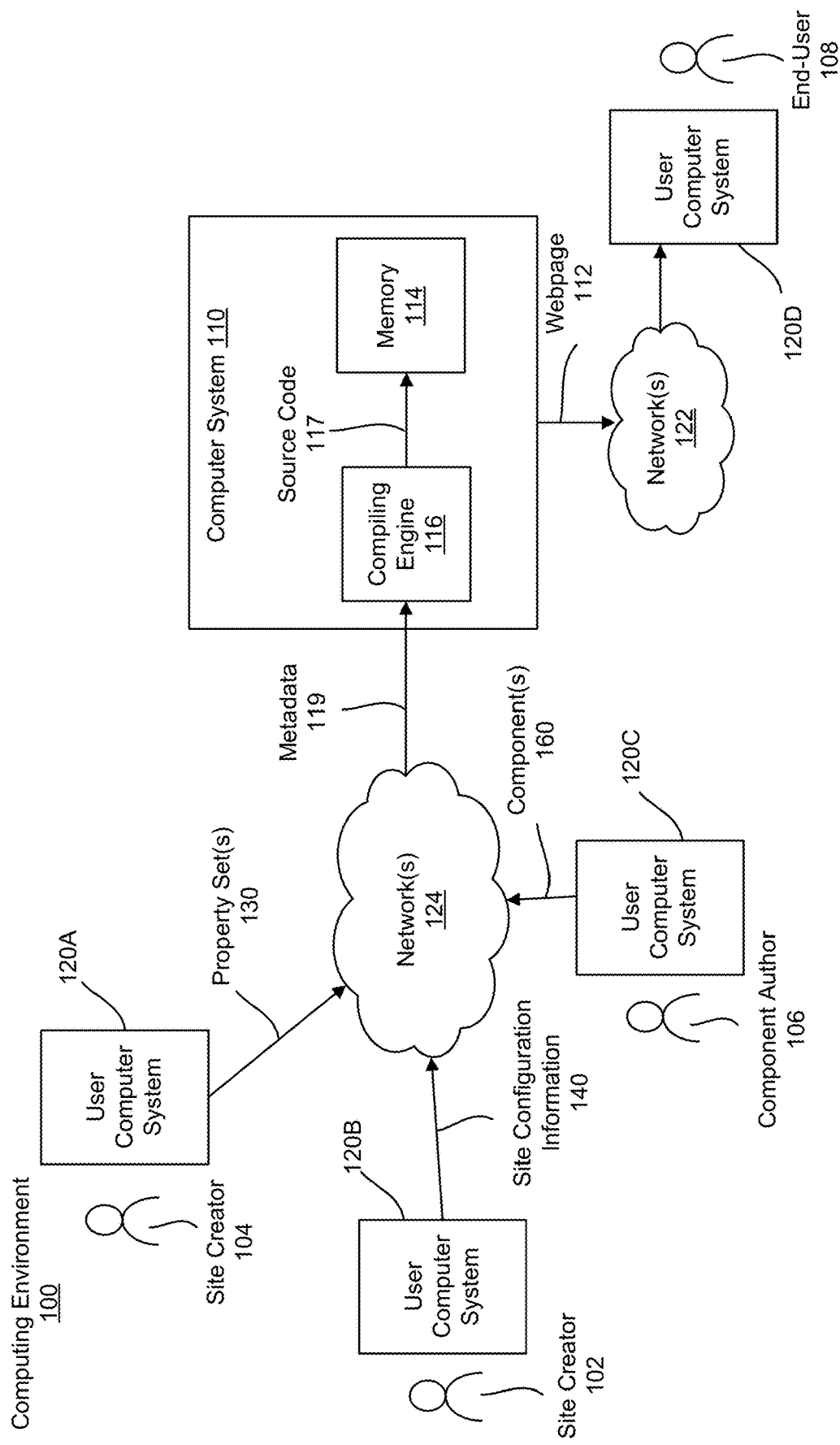
FIG. 1 is a diagram of an example computing environment incorporating one or more implementations.

Examples of systems and methods for configuring the visual appearance of webpages are described herein with reference to certain implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

To make a web site visually pleasing and representative of brand identity, a site creator or another user contributing to the site may desire to configure multiple color schemes for use with different portions of the website (e.g., sections of a webpage). This can be done programmatically if the user is sophisticated, but difficult to do via options available in software that is configured to permit a user to create a webpage in a non-programmatic manner. For example, What You See Is What You Get (WYSIWYG) software can provide a drag-and-drop user interface for building a web site and may permit a user to specify a general color scheme for the entire website. Because the color scheme is applied across the entire web site, each webpage within the web site will have the same color scheme, for example, the same color background and the same color text. Using a single color scheme can make a website difficult to read if the colors selected have poor contrast, adversely impacting end-user accessibility.

Additionally, it is desirable to have site components share the same color schemes as the site without relying on component authors to set the colors. Site components may include plugin components that can be placed onto webpages, e.g., by dropping the site components into a section of a webpage, using WYSIWGY software. In some implementations, site components are configured to automatically consume the color scheme of the section in which they appear. In this manner, a component author need not specify the colors for the component that they are creating but can instead leave the choice of colors to the site creator.

In some implementations, a set of predefined color schemes are made available in software to a site creator or other user creating a webpage. The color schemes can be generated by another user and may, for example, be defined programmatically by a user with a higher level of web design expertise than the site creator. Alternatively, the software operated by the site creator may provide an option to create a custom color scheme. Once the color schemes have been defined, the site creator can be provided with access to the color schemes and an option to choose a color scheme for use with a particular section of a webpage. Based on the site creator's choices, a computer system with a compiling engine can generate source code that reflects the colors schemes which have been assigned to different sections. The source code includes scoped containers and Cascading Style Sheets (CSS) custom properties that define the various color attributes for the scope containers. Because each container has a specific scope, the color scheme(s) assigned are applied uniformly across every element included in the corresponding section of the webpage. Additionally, containers can be nested so that a child container has a different color scheme than its parent container but may at the same time inherit one or more visual attributes of its parent such as a background color or foreground color.

The disclosed implementations may include a method for generating scoped containers. The method involves providing, by a computer system, access to a first color scheme and a second color scheme through a user interface of a software application. The first color scheme and the second color scheme each include a foreground color paired with a background color that contrasts the foreground color. At least one of the foreground color of the first color scheme or the background color of the first color scheme differs from that of the second color scheme. The method further involves assigning, by the computer system, the first color scheme to a first section of a webpage based on input at the user interface; and assigning, by the computer system, the second color scheme to a second section of the webpage based on further input at the user interface. The method further involves generating by the computer system after the assigning of the first color scheme and the second color scheme, source code representing the webpage. The source code includes a first container corresponding to the first section and a second container corresponding to the second section. Due to the first container being separate from the second container, a scope of the first container includes the first color scheme applied to one or more elements within the first section, and a scope of the second container includes the second color scheme applied to one or more elements within the second section.

The disclosed implementations may include a system that includes one or more processors and memory storing instructions that, when executed, cause the one or more processors to provide access to a first color scheme and a second color scheme through a user interface of a software application. The first color scheme and the second color scheme each include a foreground color paired with a background color that contrasts the foreground color. At least one of the foreground color of the first color scheme or the background color of the first color scheme differs from that of the second color scheme. The instructions further cause the one or more processors to assign the first color scheme to a first section of a webpage based on input at the user interface; and assign the second color scheme to a second section of the webpage based on further input at the user interface. The instructions further cause the one or more processors to generate, after the assigning of the first color scheme and the second color scheme, source code representing the webpage. The source code includes a first container corresponding to the first section and a second container corresponding to the second section. Due to the first container being separate from the second container, a scope of the first container includes the first color scheme applied to one or more elements within the first section, and a scope of the second container includes the second color scheme applied to one or more elements within the second section.

The disclosed implementations may include a non-transitory computer-readable medium storing program code, the program code including instructions that are executable by one or more processors of a computer system to perform any of the methods disclosed herein.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 is a diagram of an example computing environment 100 incorporating one or more implementations. The environment 100 includes a computer system 110 and user computer systems 120A to 120D operated by various users. As shown in FIG. 1, users may include a first site creator 102, a second site creator 104, a component author 106, and an end-user 108. Each of the user computer systems 120 can be implemented as a general purpose computing system including one or more processing units (e.g., a Central Processing Unit (CPU) or microprocessor), memory, and program instructions stored in the memory. Examples of computer systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. Depending on the role of the user, a user computer system 120 may include a web browser for viewing a webpage 112 generated by the computer system 110 based on input from the site creator 102 and/or the site creator 104. For example, a user computer system 120D operated by end-user 108 may include a web browser configured to access webpage 112 via one or more networks 122 (e.g., the Internet) and may further include a display device configured to display the webpage 112.

Computer system 110 may be configured to provide a web development platform through which computing resources are made available to users (e.g., site creators 102 and 104) for building a webpage such as webpage 112. In this respect, users of the computer system 110 may include users associated with an organization that is a customer of an organization operating the computer system 110. As shown in FIG. 1, the computer system 110 can include a compiling engine 116 and a memory 114. The compiling engine 116 can be implemented in hardware and/or software and is configured to generate source code 117 for the webpage 112 based on input from the site creator 102 and/or the site creator 104. The source code 177 can be stored in memory 114 and may include HTML, code, CSS code, JavaScript, and/or the like. Thus, the computer system 110 may include one or more servers that host the webpage 112.

Source code 177 can be generating using metadata 119 describing a configuration of the webpage 112. The metadata 119 describes the various attributes of the webpage 112, for instance, page layout, the contents of each section of the webpage (e.g., text, images, plugin components, and/or other elements), text size, text color, background color, and other visual attributes. In some implementations, compiling engine 116 may include one or more processing units configured to convert the metadata 119 into the source code 117, e.g., based on execution of a compiler program. As part of generating the source code 117, the compiling engine 116 may generate a set of scoped containers, where each container includes a list of attributes and their corresponding values. In some instances, a container includes CSS custom properties that define colors that have been assigned to the section represented by the container for use by elements (e.g., text, images, or components from component authors) of the section.

Computer system 110 can be a cloud-based computer system and, in some implementations, may support execution of software applications deployed using a Platform as a Service (PaaS) or through Software as a Service (SaaS). Platform as a service (PaaS) is a category of cloud computing services that provides a platform allowing developers and companies to develop, deploy and manage applications without the complexity of building and maintaining the infrastructure typically required to support such applications. SaaS is a software licensing and delivery model in which software applications are centrally hosted and accessed through a client application (e.g., a web browser or other thin client) by remote users.

Computing environment 100 is an example of a distributed computing environment in which tasks are performed by remote processing devices that are linked through a communications network (e.g., one or more networks 124). In a distributed computing environment, program modules may be located in both local and remote computer storage media including memory storage devices. For instance, program code may be stored and executed locally on one or more user computer systems 120 and/or on computer system 110. In the case of a cloud-based computer system 110, program code may be executed on the computer system 110 in response to input from a client application executed on a user computer system 120.

Network(s) 124 can include one or more communications networks that couple user computer systems 120A, 120B, and 120C to the computer system 110. Although shown separately from the network 122, the networks 122 and 124 may overlap and, in some instances, may be the same network, e.g., the Internet. In addition as an alternative to the Internet, network(s) 124 can include another public network, a private network such as a Local Area Network (LAN), a Wide Area Network (WAN), and/or other types of communications networks.

User computer system 120A may be configured to generate a graphical user interface through which the site creator 102 can design the webpage 112. The graphical user interface may be provided by a WYSIWYG application executed locally on the user computer system 120A. In some implementations, the application providing the graphical user interface may be a cloud application executed on the computer system 110. The site creator 102 may be a user with a lower level of web design expertise than the site creator 104. As such, the site creator 102 may not have the ability or desire to configure the webpage 112 programmatically. Instead, the site creator 102 may choose to build the webpage 112 by choosing from a limited set of options for page configuration, for example, a set of templates that define possible column layouts. The options are provided through the graphical user interface and can include an option to associate a color scheme with a user-selected section of the webpage 112. Colors schemes can be configured by another user, e.g., by the site creator 104. However, the application providing the graphical user interface may also provide an option for the site creator 102 to specify a custom color scheme. Based on the configuration performed by the site creator 102, the user computer system 120B may generate site configuration information 140 for communication to computer system 110. The site configuration information 140 can include, as part of the metadata 119, data describing the layout of the webpage 112 and the elements in each section of the webpage 112, including metadata describing visual attributes of each section.

User computer system 120B may be configured to execute an application that permits the site creator 104 to define one or more color schemes for use with the webpage 112. This application can be same application that provides the graphical user interface to the site creator 102. Alternatively, the application used by the site creator 104 may be a separate application with a different user interface that presents a metadata or source code view of the webpage 112. As indicated above, the site creator 104 may have a higher level of web design expertise than the site creator 102. Accordingly, the site creator 104 may define color schemes programmatically. The color schemes defined by the site creator 104 can be encoded as property sets 130 that form part of the metadata 119 communicated to the computer system 110. A property set (also referred to herein as a "branding set") includes one or more color combinations. The color combinations are typically expressed as color pairs, for example, a background color paired with a foreground color that contrasts the background color. Thus, each property set may include one or more color pairings. When applied to a section of the webpage 112, a branding set will define the visual appearance of any elements appearing within that section, subject to the scope of the container representing the section. The property sets 130 can be maintained by the computer system 110 (e.g., stored in memory 114) and are made available to the site creator 102 via the user computer system 120B and/or available to the site creator 104 via the user computer system 120A.

User computer system 120C is operated by the component author 106 to create one or more site components 160 for possible inclusion in the webpage 112. A webpage can include different types of interactive or non-interactive components (e.g., radio or other buttons, checkboxes, progress indicators, tables, and the like) that are created by component authors and incorporated into a webpage by site creators or other users tasked with building the webpage. Although only one component author is shown, the webpage 112 may be a result of contributions from multiple component authors. Component authors can include first-party authors who are users associated with the computer system 110, second-party authors who are users external to the organization associated with the computer system 110 (e.g., a vendor company contracted to design a particular component), and third-party authors associated with an organization that owns the webpage 112 (e.g., the organization to which the site creators 102 and 104 belong).

As part of creating a component 160, the component author 106 may configure the visual appearance of the component, e.g., the size and shape of a button. However, in order to have a consistent look and feel across webpage 112, it may not always be desirable for the component author 106 to specify the color(s) of the component 160. Instead, the component 160 may be configured to consume the color scheme of the section in which the component appears. For instance, the component 160 may reference CSS custom properties specified for whichever container the component is put into, thereby adopting the same color scheme as another element in the same container. Thus, the component author 106 could specify that the component 160 has a first color in a first (e.g., default) state and a second color in a second state (e.g., on-click or hover) but without specifying which colors to use as the first color and the second color.

In FIG. 1, examples of different users of the computer system 110 are shown in order to better illustrate tasks that can be performed as part of building the webpage 112. However, the roles of the various users may, in practice, be combined or overlap to some degree. For example, the site creator 104 may, in addition to creating the property sets 130, design a section of the webpage 112 from scratch, edit a section design started by the site creator 102, or work on a different webpage that is part of the same web site as the webpage 112. Similarly, the site creator 104 could also be a component author.

Figure 2:
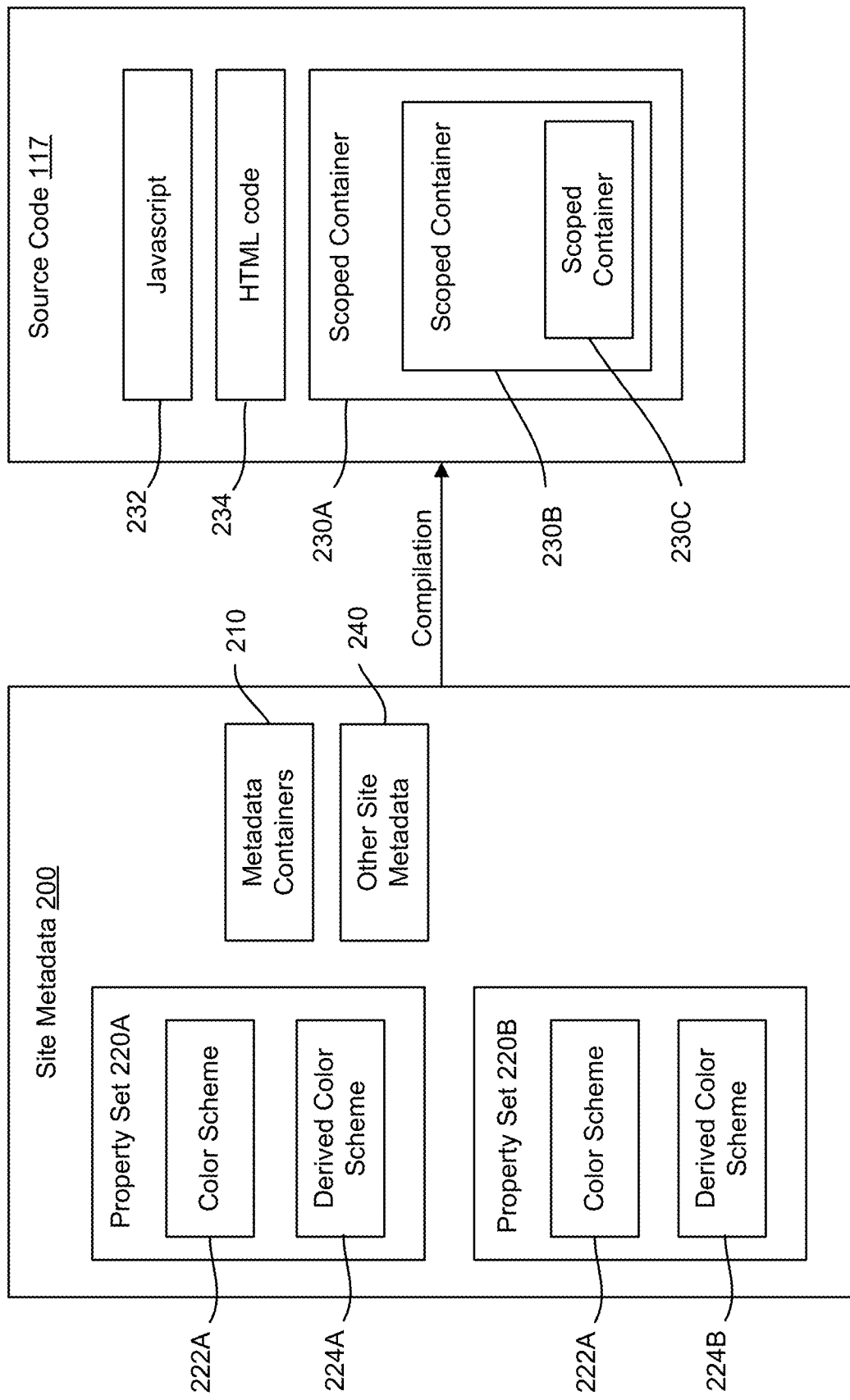
FIG. 2 illustrates source code for a webpage according to some implementations.

FIG. 2 illustrates the source code 117 being generated from metadata 200, according to some implementations. The metadata 200 may correspond to metadata 119 in FIG. 1 and can include metadata for an entire web site. In some implementations, the metadata 200 is formatted as one or more JavaScript Object Notation (JSON) files. Some of the metadata 200 may be specific to an individual webpage such as webpage 112. As shown in FIG. 2, the metadata 200 can include one or more property sets 220, e.g., a property set 220A and a property set 220B, where each property set 220 includes a color scheme 222. As described above in connection with FIG. 1, color schemes can be specified by the site creator 104 and/or the site creator 102 and made available for associating with different sections of a webpage. Accordingly, property set 220A may include a color scheme 222A specified by site creator 102, and property set 220B may include a color scheme 222B specified by site creator 104. Computer system 110 may assign individual property sets 220 to each section of the webpage based on input from a user, for example, input from the site creator 102 at the user computer system 120B.

In addition to color schemes 222, a property set 220 may include one or more derived color schemes 224, which are system-generated color schemes derived from color schemes 222. For example, computer system 110 may be configured to generate a derived color scheme 224A based on one or more colors specified in the color scheme 222A. Similarly, computer system 110 may generate a derived color scheme 224B based on one or more colors specified in the color scheme 222B. The derived color schemes 224A and 224B may correspond to colors used during certain situations that are likely to occur as part of viewing and interacting with a webpage. For example, each of the property sets 220 may include one or more system-generated color pairings for each of the following color categories:

Success: Used to communicate success (e.g., a green background paired with a black foreground), Destructive: Used to communicate an error or an invalid state (e.g., a red background paired with a white foreground), Warning: Used to communicate a warning to an end-user (e.g., a yellow background paired with a black foreground), Info: Used to communicate non-urgent information (e.g., a blue background paired with a white foreground), and Neutral: Used to break the flow between elements that have borders or shadows. Can also be used for non-urgent informational elements and/or non-interactive elements such as icons (e.g., a gray background paired with a black foreground).

To generate a derived color scheme 224, the computer system 110 may select from a set of colors and determine an appropriate shade of the selected color based on the shade of a color in a color scheme 222. In some instances, the colors that can be chosen are a subset of all possible colors, e.g., destructive colors may be limited to being red paired with white. Thus, computer system 110 may select a shade of red as a background color of a first color pair in a destructive color scheme and to achieve a sufficient level of contrast (e.g., a threshold contrast ratio) with the background color of the color scheme 222A. Further, the computer system 110 can vary the shade of red for use as a background color of a second color pair in the destructive color scheme (e.g., a darker red background paired with a white foreground). Another option is to invert the foreground and background colors to define yet another color pairing (e.g., a white background paired with a red foreground). Accordingly, a button used to communicate a warning might be a red button that includes white text and/or includes a white image (e.g., a stop icon or X mark), whereas a mandatory input field for which an end-user initially supplied an invalid value might be a white box with a red border and the words "you must complete this field" in red. In this manner, each property set 220 can be configured with its own set of system-generated colors that supplement the user-configured colors of the property set.

Metadata 200 may further include metadata representations of scoped containers 230 in the source code 117. Each metadata container 210 includes data describing a corresponding scoped container 230. For instance, a metadata container 210 can include, among other things, data indicating CSS custom properties that determine the color scheme for a corresponding scoped container 230. Additionally, metadata 200 may include other metadata 240 describing a web site, for example, metadata describing a column layout of the webpage 112, what components or other web elements are included in each section of the webpage 112, an order in which sections or elements within a section are arranged, and so on.

Source code 117 corresponds to metadata 200 after undergoing a compilation process (e.g., by the compiling engine 116). Source code 117 can be parsed by a web browser or other application configured to display webpages and can include, in addition to the scoped containers 230, JavaScript 232 and HTML code 234. JavaScript 232 includes JavaScript code that defines the interactive behavior for one or more elements of a web site. For instance, the JavaScript 232 may include code defining the on-click behavior of a component 160 included in the webpage 112. The HTML code 234 may include one or more HTML documents for various parts of the website including webpage 112. The HTML code 234 may reference the scoped containers 230. In some implementations, the scoped containers 230 may be integrated into the HTML code 234.

FIG. 2 shows the scoped containers 230a as being nested. For example, as illustrated, a scoped container 230A serves as a parent container for a scoped container 230B, which is in turn the parent of a scoped container 230C. The nesting may be a result of different color schemes being assigned to sections that are arranged in hierarchical manner. For example, scoped container 230A may represent the highest level of the hierarchy for the webpage 112 and may correspond to a background against which various sections of the webpage 112 are displayed. Scoped container 230B may correspond to a first section of the webpage and scoped container 230C may correspond to a sub-section within the first section. For instance, scoped container 230B could represent a sidebar and scope container 230C could represent a region of the sidebar that contains a search box or other interactive element. In this manner, each webpage of a web site can be represented as a set of scoped containers, with the scoped containers optionally being nested.

Figure 3A:
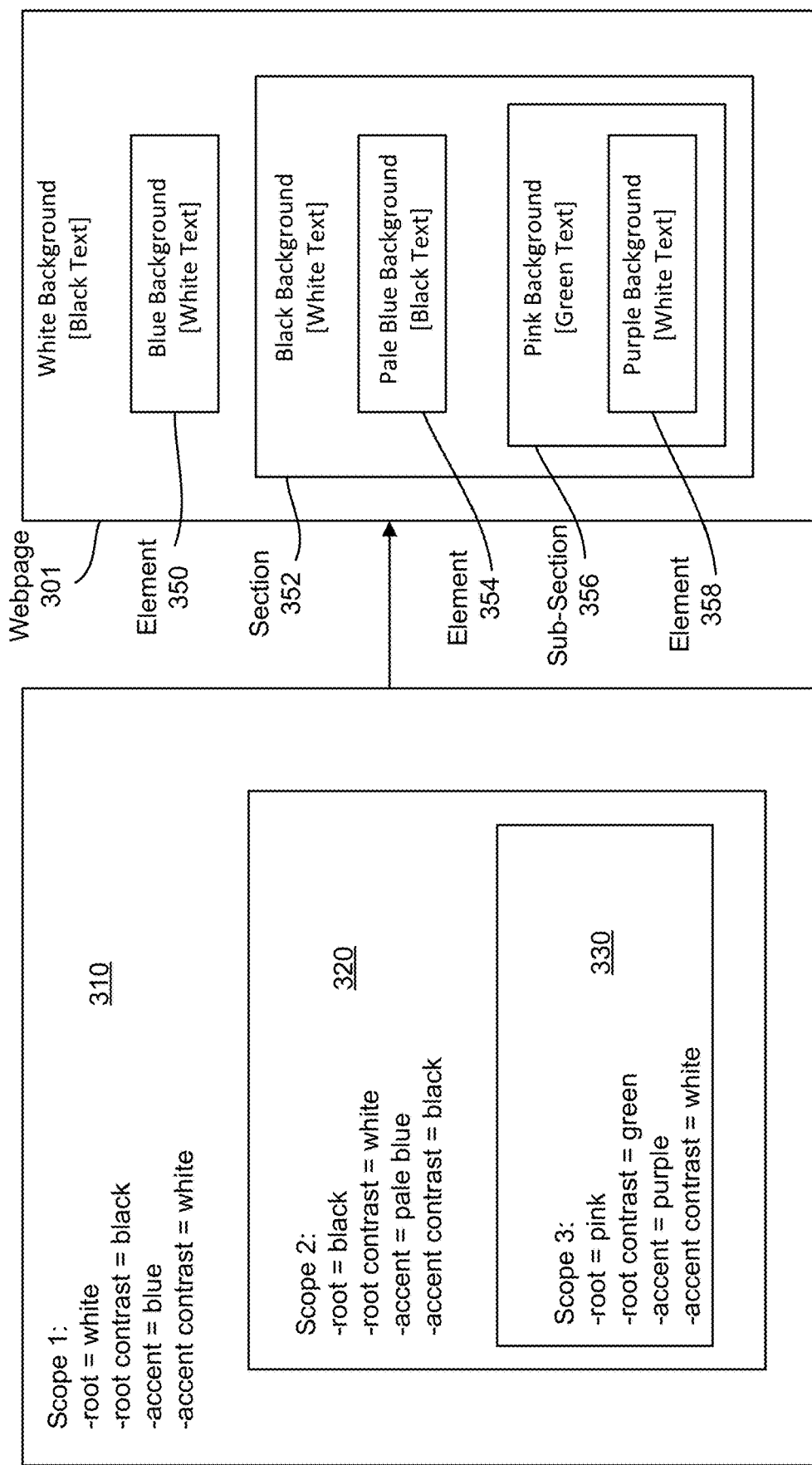
FIG. 3A shows an example of how scopes of nested containers can affect the visual appearance of a webpage.

FIG. 3A shows an example of how scopes of nested containers can affect the visual appearance of a webpage. In FIG. 3A, a first container 310 has Scope 1, a second container 320 has Scope 2, and a third container 330 has Scope 3. The arrangement of containers in FIG. 3A mirrors that which is shown in FIG. 2. Scope 1 includes a "root" color that is white. The root represents the highest level in a color hierarchy within a color scheme and generally corresponds to a basic background color against which other colors in the color scheme are contrasted. Each background color in a color scheme may include a corresponding foreground color that operates as a contrast to the background color. In this example, the white root is paired with a black root contrast. As shown in FIG. 3A, a color scheme can include multiple color pairings. For example, in addition to having a root and a root contrast, Scope 1 includes an accent color (blue) paired with an accent contrast color (white). In general, accent colors are designed to draw attention to certain elements of a webpage by making those elements stand out in visual contrast to the background of the webpage. Similar to the root contrast, the accent contrast can be designed to contrast the accent color. In this example, the accent contrast for Scope 1 is the same as the root color.

Scope 2 includes a black root paired with a white root contrast. Since the root color relationship is the inverse of the root pairing in Scope 1, the background of the second container 320 contrasts the background of the first container 310. Additionally, Scope 2 includes a pale blue accent paired with a black accent contrast. Scope 3 includes a pink root paired with a green root contrast, and a purple accent paired with a white accent contrast.

The right side of FIG. 3A illustrates how the different scopes (Scope 1, Scope 2, and Scope 3) may interact to collectively determine the visual appearance of a webpage 301. As shown, a background of the webpage 301 is white and includes black text. Within this white background is an element 350 (e.g., an accent button) having a blue background and white text. The colors of the background and the element 350 are the colors associated with Scope 1. Additionally, the webpage 301 includes a section 352 having a black background and white text. Section 352 includes an element 354 (e.g., another accent button) having a pale blue background and black text. The colors of the section 352 and element 354 are the colors associated with Scope 2. In turn, the section 352 includes a sub-section 356 having a pink background and green text. Sub-section 356 includes an element 358 (e.g., yet another accent button) having a purple background and white text. The colors of the sub-section 356 and element 358 are the colors associated with Scope 3.

From the example of FIG. 3A, it can be seen that by applying a specific color scheme to a section of a webpage, the section can be represented in source code as a container whose scope is commensurate with the colors defined in the color scheme. The colors within a container are automatically applied to each element in the container. In the case of nested containers, the colors within a parent container can be automatically inherited by a child container unless the colors of the parent are overridden by the colors of the child.

Figure 3B:
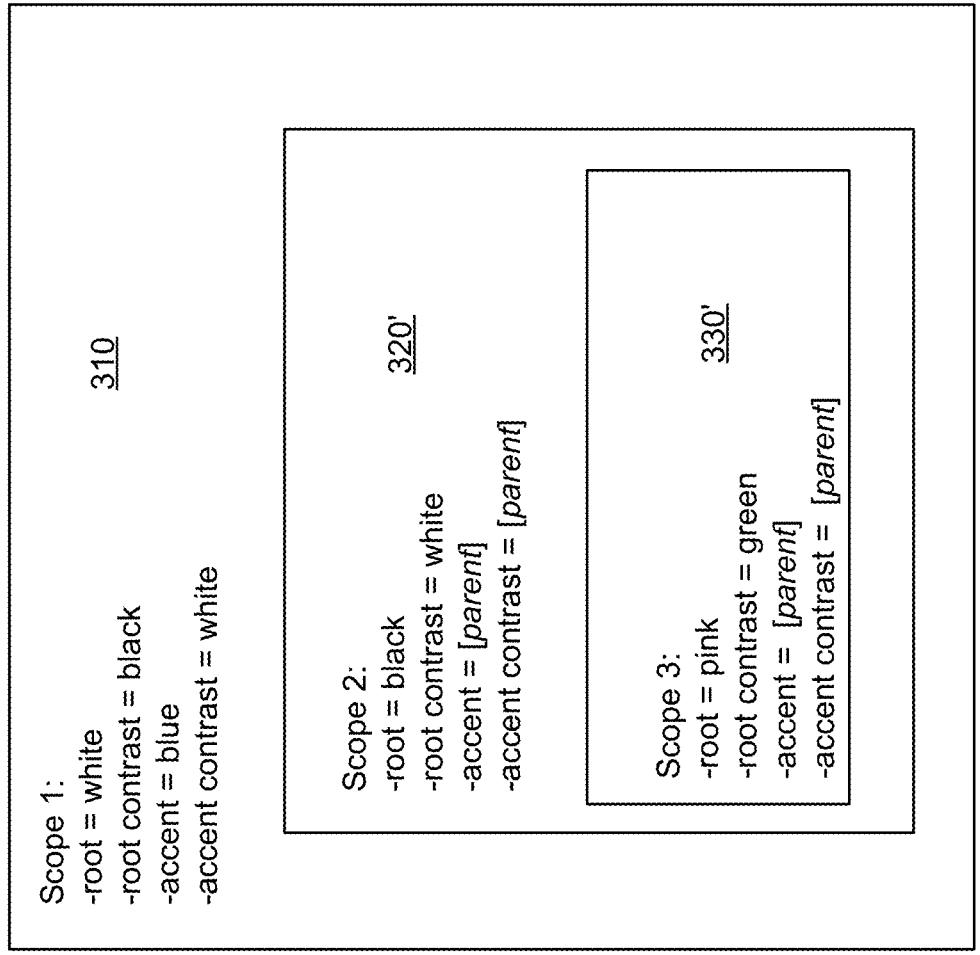
FIG. 3B shows an example of inheritance of colors from a parent container.

FIG. 3B shows an example of inheritance of colors from a parent container. In FIG. 3B, the first container 310 is the same as in FIG. 3A. However, the child containers (labeled 320' and 330') differ from the example of FIG. 3A in that the accent and accent contrast colors are linked to that of a parent container. The linking may be a result of accent and accent contrast colors not being explicitly defined for the color schemes corresponding to the child containers 320' and 330'. Consequently, the container 320' inherits the accent and accent contrast colors of its parent container 310 (blue and white), and the container 330' inherits the accent and accent contrast colors of its parent container 320' (blue and white, as explained previously). In this manner, colors can be inherited across multiple levels of a nested container hierarchy. Inheritance is useful for situations where colors are reused across different containers. This is often the case with system-generated colors such as the warning, info, and destructive colors described above. However, colors of user-configured color schemes can also be reused. Therefore, a user who configures a custom color scheme (e.g., as part of creating a property set 220) may choose to omit certain color pairings with the expectation that the omitted color pairings will be supplied by a parent container of the container to which the custom color scheme is to be applied.

Although described with respect to color, inheritance between parent and child containers can occur with other types of visual attributes, e.g., text size or font. Any visual attribute that has been specified for a parent container can be inherited by a child container when no corresponding visual attribute has been specified for the child container.

Figure 4:
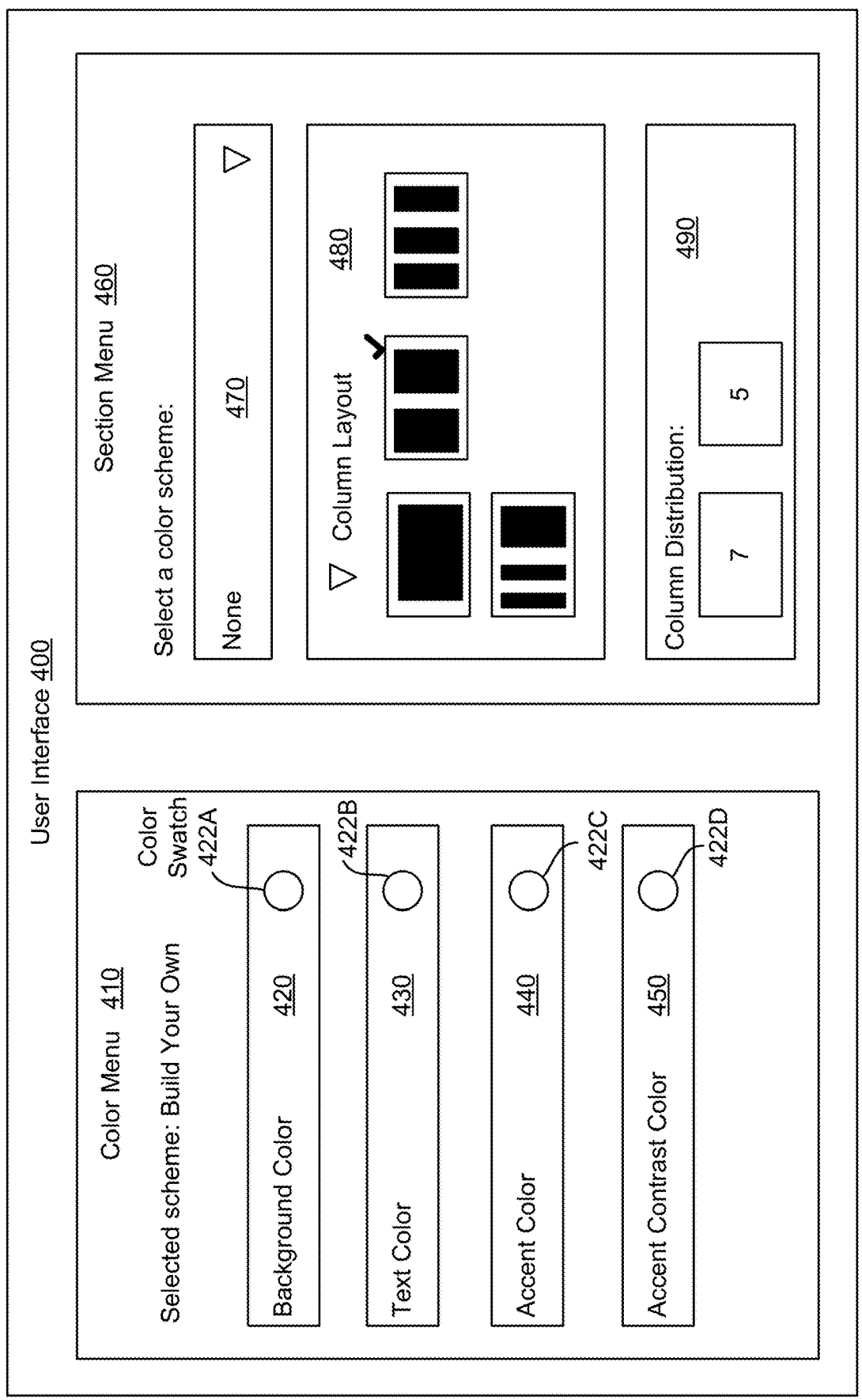
FIG. 4 shows an example of a user interface according to an implementation.

FIG. 4 shows an example of a user interface 400 configured to provide an option to specify a custom color scheme according to an implementation. The user interface 400 is a graphical user interface that can be generated by a software application (e.g., a WYSIWYG program) executing on a user computer system 120 or on the computer system 110. The user interface 400 includes a color menu 410 through which a user (e.g., site creator 102 or site creator 104) can configure a custom color scheme.

Color menu 410 includes a list of configurable colors. For example, FIG. 4 shows the background color, text color, accent color, and accent contrast color as being configurable. FIG. 4 is merely an example. In practice, the list of configurable colors can include a greater or lesser number of colors and/or colors for other types of webpage elements. The color menu 410 permits the user to individually specify colors without the user necessarily being aware that such colors will be combined into color pairs (e.g., a background color and a foreground color or, more generally, a color and its corresponding contrast color). However, a more skilled user such as the site creator 104 could choose to programmatically configure color pairs rather than specifying colors individually through the user interface 400.

For each configurable color, the color menu 410 may display an option to configure the color and a color swatch 422 of what the color looks like when displayed on a webpage. For instance, the color menu 410 can include an option 420 to configure the background color and a color swatch 422A to display the color currently set for the background. Color menu 410 can include similar options 430, 440, and 450 for the text color, accent color, and accent contrast color, respectively, together with corresponding color swatches 422B, 422C, and 422D.

User interface 400 may further include a section menu 460 for configuring a selected section of a webpage. The section menu 460 includes an option 470 (e.g., a dropdown list) to select a color scheme from among a set of predefined (i.e., existing) color schemes for associating with the selected section. For instance, option 470 may be configured to permit the user to associate one of the property sets 220 in FIG. 2 with the selected section. In the example of FIG. 4, the user has chosen to create their own color scheme instead of selecting a predefined color scheme. It should be noted however, that user-configured color schemes can be saved (e.g., in the memory 114 of the computer system 110) and made available for subsequent selection. Thus, the option 470 can be configured to present a list of all color schemes (e.g., in the form of property sets 220) that have been generated to date for a web site or webpage.

Section menu 460 may include one or more options to configure a layout of the selected section of the webpage. For instance, section menu 460 can include an option 480 to choose from among a set of predefined column layouts (e.g., single column, two columns, three uniform columns, three non-uniform columns, and so on). Further, section menu 460 can include an option 490 to configure column distribution. For example, if the user selects a two-column layout through the option 480, a window of the option 490 may refresh to show a visual representation of each of the two columns, together with an indication of the relative widths of the columns and slider bars or other interactive controls for adjusting column width.

Figure 5:
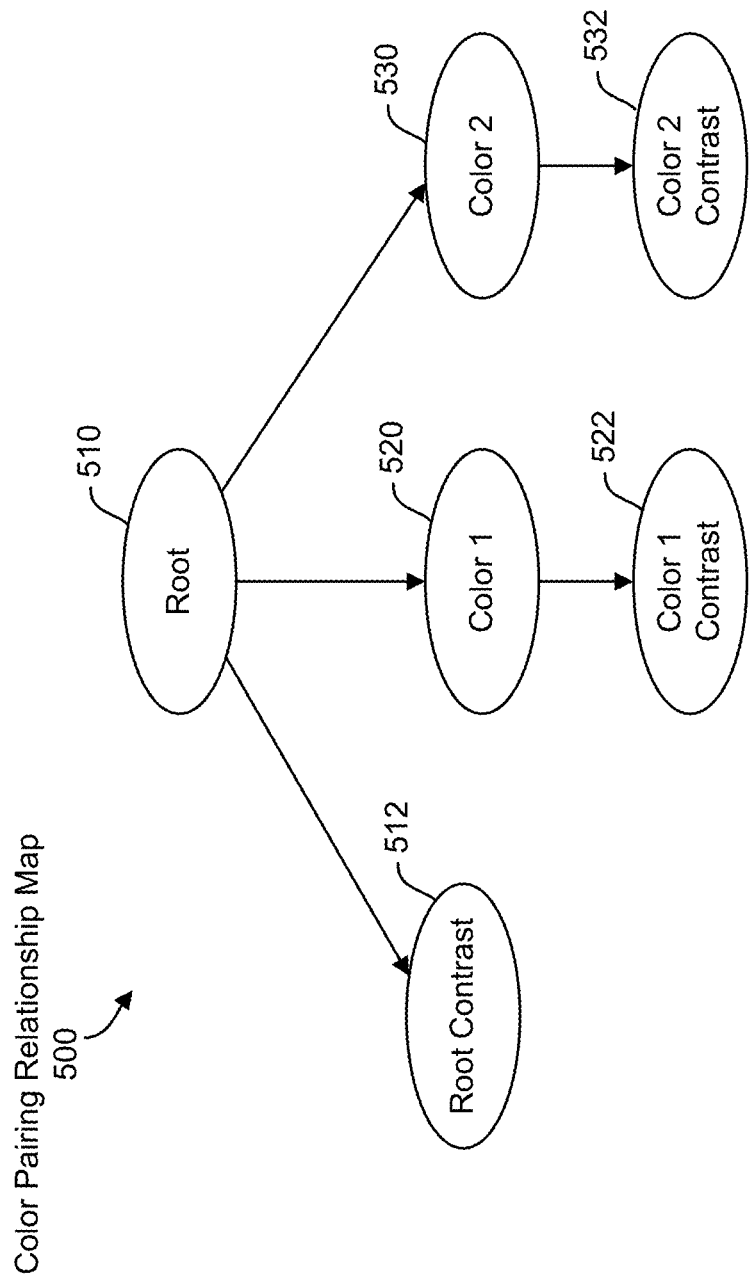
FIG. 5 shows an example of a color pairing relationship map illustrating how different colors that form a color scheme may be related.

FIG. 5 shows an example of a color pairing relationship map 500 to illustrate how different colors that form a color scheme may be related to each other. The map 500 may, for example, correspond to a relationship map for one of the color schemes 222 in FIG. 2. The map 500 has a tree structure that begins with a node 510 representing a root color (e.g., the background color of a webpage or section of a webpage). Descended from the node 510 is a node 512 representing a root contrast. For example, the node 510 may represent the white root of Scope 1 in FIG. 3A, and the node 512 may represent the black root contrast of Scope 1. The node 510 and the node 512 correspond to a first color pairing. Nodes representing additional color pairings can be descended from the root node 510. In the example of FIG. 5, there is a node 520 representing a first color (paired with a node 522 representing a color that contrasts the first color) and a node 530 representing a second color (paired with a node 532 representing a color that contrasts the second color). Each of these additional color pairings may include colors that are selected (e.g., by a user or by computer system 110) to achieve a certain level of contrast when viewed against the root color. For example, node 520 may represent the blue accent of Scope 1 and node 522 may represent the white accent contrast of Scope 1. FIG. 5 is a simplified example. Any number of color pairs can be defined for a color scheme. A more complex example including system-generated colors is shown in FIG. 6.

Figure 6:
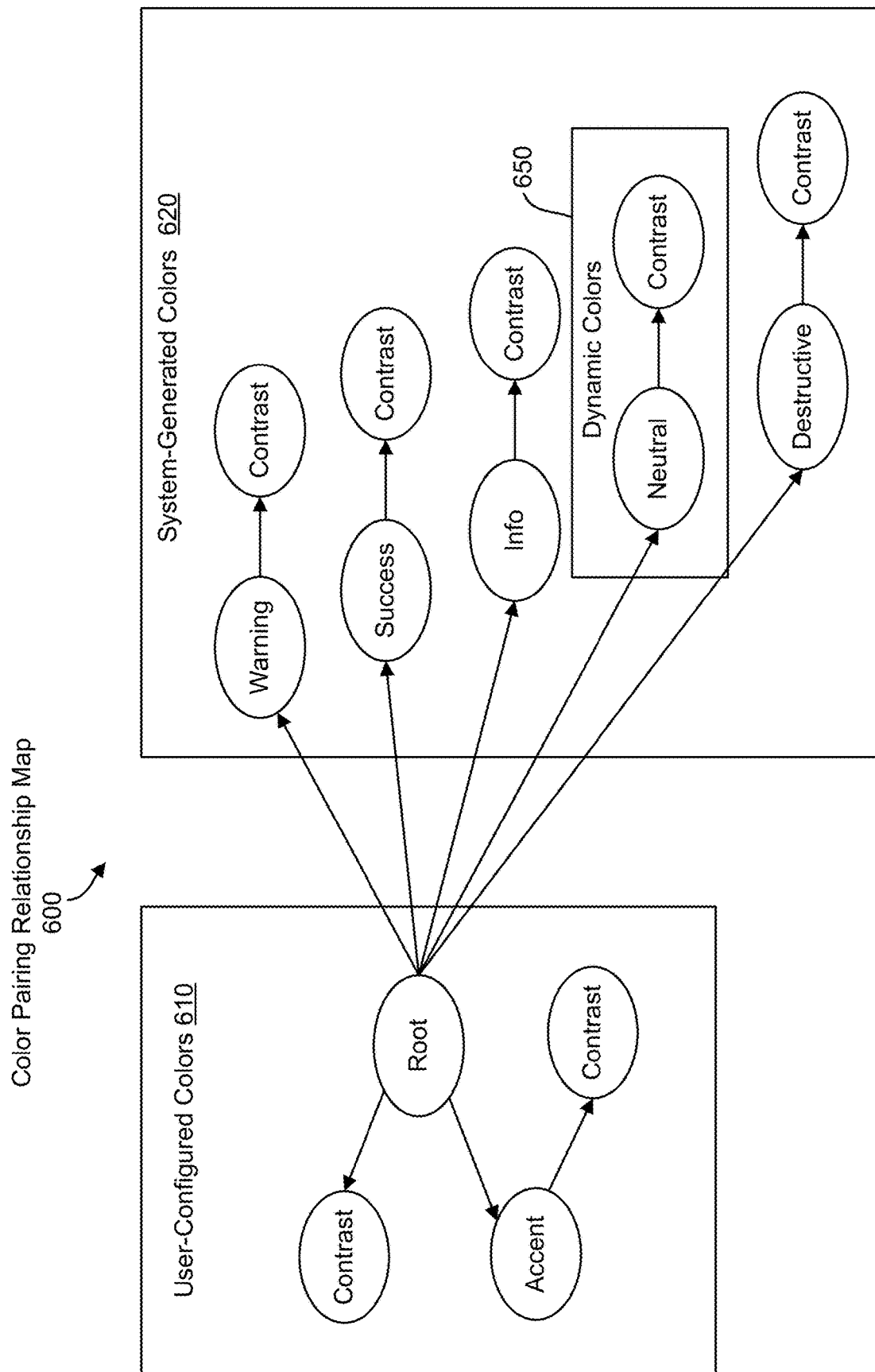
FIG. 6 shows an example of a color pairing relationship map for a color scheme that includes user-configured colors and system-generated colors.

FIG. 6 shows an example of a color pairing relationship map 600 for a color scheme that includes user-configured colors 610 and system-generated colors 620. The user-configured colors 610 include a root color, a root contrast, an accent color, and an accent contrast color and may correspond to colors that are configurable through the user interface 400 of FIG. 4. The system-generated colors 620 include a warning color, a success color, a info color, a destructive color, and a neutral color, along with corresponding contrast colors. The functions of these system-generated colors are described above in connection with FIG. 2. As indicated above, system-generated colors can be derived from (or related to) user-configured colors. For example, as shown in FIG. 6, each of the above-mentioned system-generated colors can be a color that contrasts the root color. At least some of the system-generated colors may be dynamically updated based on the current root color (e.g., in response to a user manually changing the root color or in response to the user switching to another color scheme that has a different root color). In FIG. 6, dynamic colors 650 include the neutral color and its corresponding contrast color. As mentioned above, neutral can be used to break the flow between elements that have borders or shadows, for non-urgent informational elements, and/or for non-interactive elements. As such, neutral colors tend to be frequently used throughout a webpage, often directly juxtaposed against the main background (e.g., the root color) of a section. It is therefore beneficial from an accessibility standpoint for a neutral color (and its contrast color) to be tied to a root color so that the neutral color has sufficient contrast even if the root color is changed over time, e.g., by site creator 102 or site creator 104 as part of redesigning the webpage 112.

Figure 7:
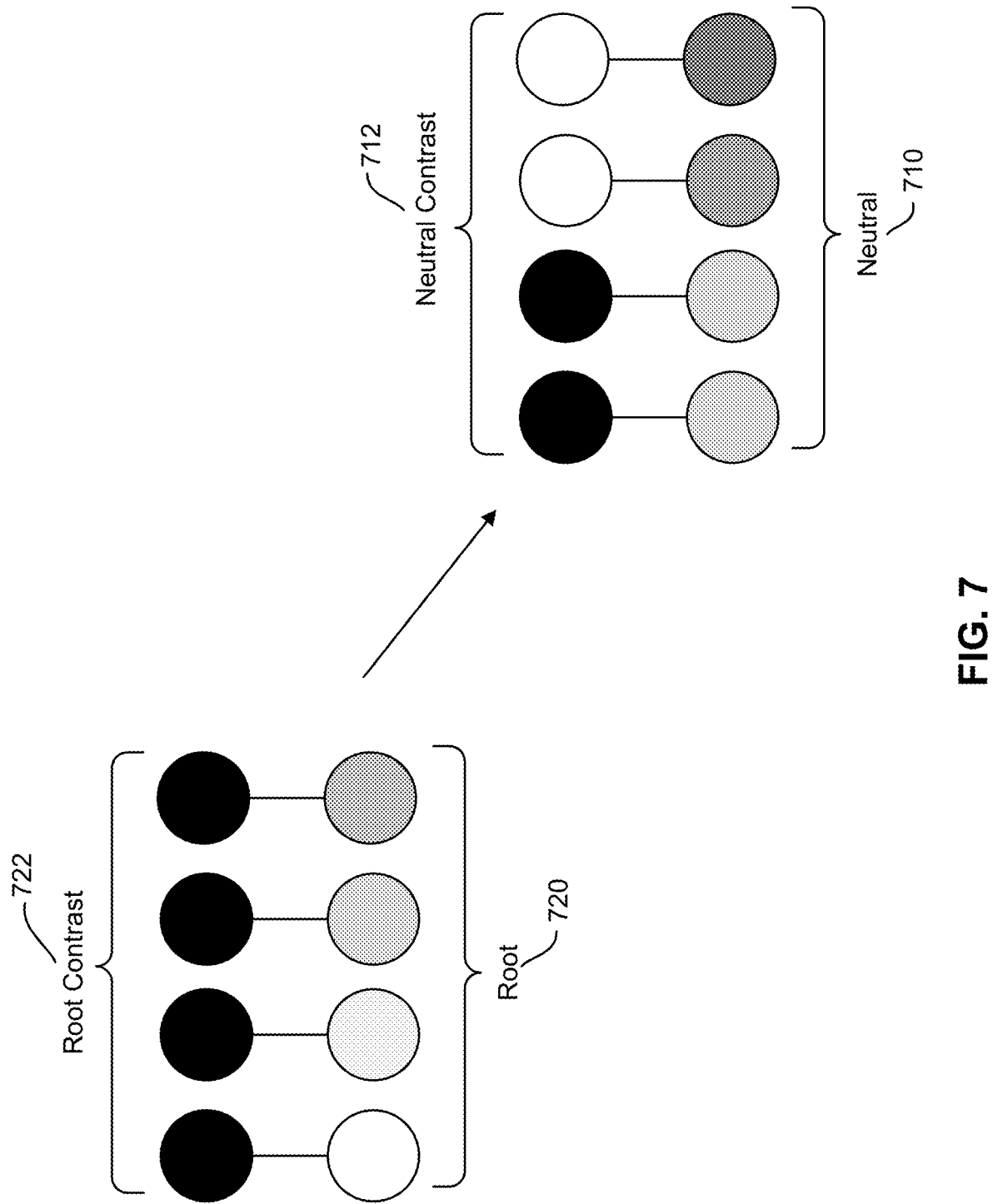
FIG. 7 shows an example of dynamic color changes according to some implementations.

FIG. 7 shows an example of dynamic color changes according to some implementations. In FIG. 7, a neutral color 710 and its corresponding contrast color (neutral contrast 712) are updated in accordance with changes in a root color 720. The updating of the neutral color 710 and the neutral contrast 712 can be performed automatically, e.g., by the computer system 110, in response to changes to the root color 720. Although the neutral color 710 and the neutral contrast 712 are tied to the root color 720, changes to a root contrast 722 may also trigger corresponding changes to the colors 710 and 712 in some implementations. As the root color 720 gradually gets darker (e.g., changed from white to a medium gray), the neutral color 710 gets progressively darker so that the gray of the neutral color 710 is kept darker than the root color 720. Additionally, the neutral contrast 712 is initially black, but once the neutral color 710 reaches a sufficiently dark shade of gray the neutral contrast 712 can be switched to white in order to provide sufficient contrast against the neutral color 710. Similarly, if the root color 720 was initially dark (e.g., black) and became lighter, the neutral color 710 could begin as a darker gray and progressively get lighter, with the neutral contrast 712 switching from white to black at some point.

FIG. 8A shows an example of metadata 800 describing colors for a branding set (e.g., one of the property sets 220 in FIG. 2) according to some implementations. For simplicity and ease of illustration, only certain items of metadata are shown. Metadata for a webpage can include multiple sets of metadata 800, e.g., a separate set of metadata 800 for each container of the webpage. Thus, the metadata 800 can be considered a metadata container that is associated with a corresponding source code container. The metadata 800 is JSON-formatted and includes a first set 802 of key-value pairs that describe a background color, a second set 804 of key-value pairs that describe a text color, a third set 806 of key-value pairs that describe a primary accent color, and a fourth set 808 of key-value pairs that describe a primary accent foreground color. Each of the metadata sets 802, 804, 806, and 808 includes a descriptive label for a corresponding color (e.g., "Background Color") and a color value. The color value can be in expressed in any standard format or combination of standard formats, for example, hexadecimal code (e.g., "#ffffff for white) and/or RGB decimal code (e.g., [255, 255, 255] for white). Further, each of the metadata sets 802, 804, 806, and 808 can include a token string that can be converted into a CSS custom property. For instance, the string "--dxp-g-root" can be converted into a CSS custom property referencing a corresponding color value, e.g., "--dxp-g-root: #ffffff."

FIG. 8A is a simplified example to illustrate that metadata describing different types of colors can be used to represent a branding set. Metadata for a branding set can describe other visual attributes besides color. For instance, the metadata 800 may include key-value pairs that describe different font styles (e.g., heading text styles that differ in regard to font size, font weight, font style, etc.), body text styles, button text styles, link text styles, column spacing, and/or the like. Thus, the metadata 800 could, in practice, include multiple sets 802 of metadata describing different background colors (e.g., different shades of a root color), multiple sets 804 of metadata describing different text colors, and/or multiple sets 806 of metadata describing different accent colors.

FIG. 8B shows an example of CSS code 810 according to some implementations. The CSS code 810 includes CSS custom properties that can be generated from metadata describing a color scheme associated with a container. The CSS code 810 includes a first set 812 of CSS custom properties that define various types of colors including user-configured colors (e.g., root, brand) and system-generated colors (e.g., warning, success, info, neutral, destructive). CSS code 810 further includes a second set 814 of CSS custom properties that define some of the visual attributes mentioned above in connection with FIG. 8A (e.g., heading text styles, body text styles, etc.).

CSS code 810 can be generated as a result of processing metadata such as the metadata 800 through a compiling engine. In the example of FIG. 8B, the CSS code 810 is generated for a root level container, which could be an overall container for a webpage or, in some instances, an entire web site. Thus, the CSS code 810 could represent a color scheme fora container that has a site-wide or page-wide scope.

Figure 8C:
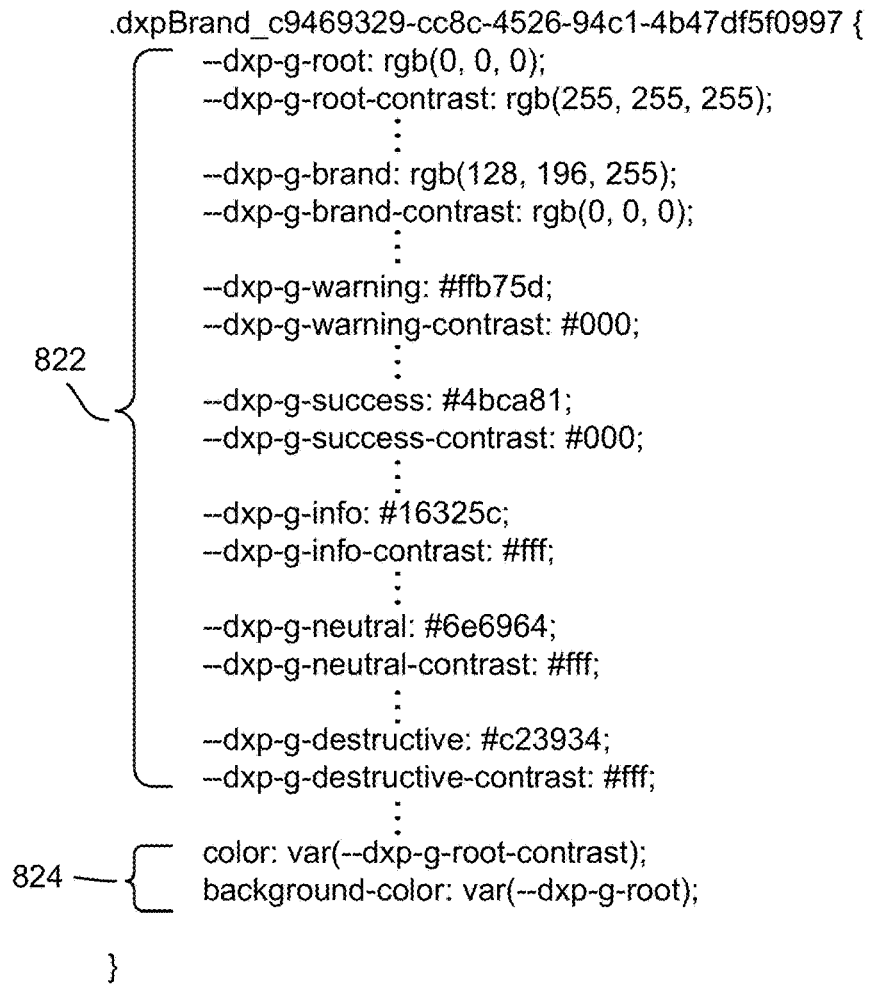

FIG. 8C shows an example of CSS code 820 according to some implementations. The CSS code 820 has a structure like that of the CSS code 810 in FIG. 8B. Depending on which container the CSS code 820 is generated for, the CSS code 820 can include a greater or lesser number of CSS custom properties. For example, if the CSS code 820 represents the color scheme for a child container of the root level container discussed above with respect to FIG. 8B, the CSS code 820 may include a more compact set of CSS custom properties that omits certain visual attributes such as those in the second set 814 of CSS custom properties. Instead of having such visual attributes be explicitly defined, the container to which the CSS code 820 corresponds may simply inherit those visual attributes from a parent container such as the root level container associated with CSS code 810. Accordingly, as shown in FIG. 8C, the CSS code 820 may include a first set 822 of CSS custom properties for user-configured and system-generated colors (similar to the first set 812 of CSS custom properties in FIG. 8B) and may further include a pair of CSS variables 824 that define a foreground color and a background color as being a root contrast color and a root color, respectively.

Figure 9:
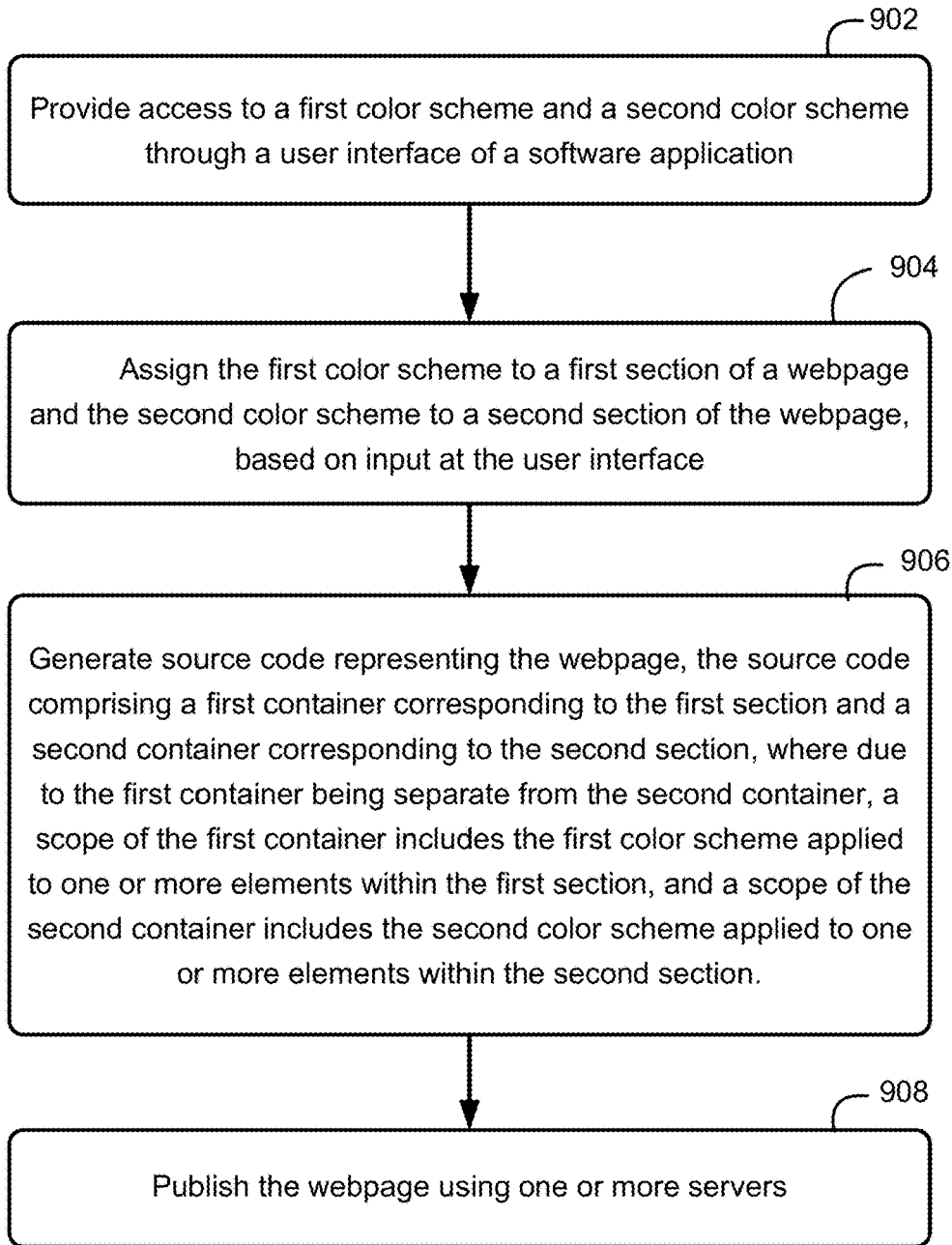
FIG. 9 is an example flow diagram of a process that may be used to generate scoped containers for a webpage, in accordance with some implementations.

FIG. 9 shows an example flow diagram of a process 900 that may be used to generate scoped containers for a webpage, in accordance with some implementations. The process 900 can be performed by one or more processors of a computer system configured to provide a web development platform (e.g., computer system 110 in FIG. 1) and using input from a user computer system (e.g., user computer system 120A or 120B).

At 902, the computer system provides access to multiple predefined color schemes including a first color scheme and a second color scheme. The multiple color schemes can include user-configured color schemes (e.g., created using the user interface 400 of FIG. 4 or defined programmatically), system-generated color schemes that are derived from user-configured color schemes, or a combination of user-configured and system-generated color schemes. As described above in connection with the example of FIG. 2, user-configured color schemes and system-generated color schemes can be combined into property/branding sets. User-configured color schemes can be generated through input from one or more users. In some instances, a user-configured color scheme is a product of contributions from multiple users. For example, site creator 102 may configure a color scheme that is later modified by site creator 104 to produce a new color scheme or to update the existing color scheme.

Providing access to a color scheme may involve outputting an indicating of available color schemes (e.g., a list of color schemes/property sets saved in the memory 114). The indication can be output through a user interface of a software application executed on or accessed via a user computer system (e.g., option 470 of the user interface 400). Providing access to a color scheme may further involve granting a user of the software application permission to associate an available color scheme with a section of a webpage selected by the user. In some implementations, the granting of permission may be based on a role of the user and/or an identity of the user, with different users or user roles having access to different color schemes. For example, an administrative user may have access to all color schemes/property sets stored in the memory 114, whereas a non-administrative user may only have access to a subset of color schemes/property sets.

Each color scheme includes at least one color pairing (e.g., a foreground color paired with a background color). In the case of the first color scheme and the second color scheme in 902, the foreground colors and/or the background colors may differ between the first color scheme and the second color scheme.

At 904, the computer system assigns the first color scheme to a first section of a webpage and the second color scheme to a second section of the webpage, based on input at the user interface. For instance, the assigning in 904 may be in response to the user choosing the first color scheme while working on the first section and then choosing the second color scheme while working on the second section. As part of assigning the first color scheme and the second color scheme, the computer system may generate or collect from the user computer system metadata describing the first section and the second section, including metadata that references the first color scheme and the second color scheme in connection with their corresponding sections.

At 906, the computer system generates source code representing the webpage. The generating of the source code may involve converting the metadata from 904 into containers that include CSS custom properties. Depending on the how the first section and the second section are arranged on the webpage, a first container corresponding to the first section and a second container corresponding to the second section may or may not be nested. If the containers are nested, the generating of the source code may involve configuring a child container (e.g., the second container) to inherit one or more colors that are specified in a parent container (e.g., the first container) but not specified in the child container. Alternatively or additionally, the generating of the scope code may involve configuring a child container to override a color specified in its parent container using the color scheme of the child container. Irrespective of whether the containers are nested, each container will have a specific scope that encompasses the color scheme assigned to its corresponding section. Because the first container and the second container are separate, a scope of the first container will include the first color scheme applied to one or more elements within the first section, and a scope of the second container will include the second color scheme applied to one or more elements within the second section.

At 908, the computer system publishes the webpage, making the webpage accessible to one or more end-users. For instance, publishing may involve uploading a copy of the source code to one or more servers that are accessible via the Internet.

Figure 10A:
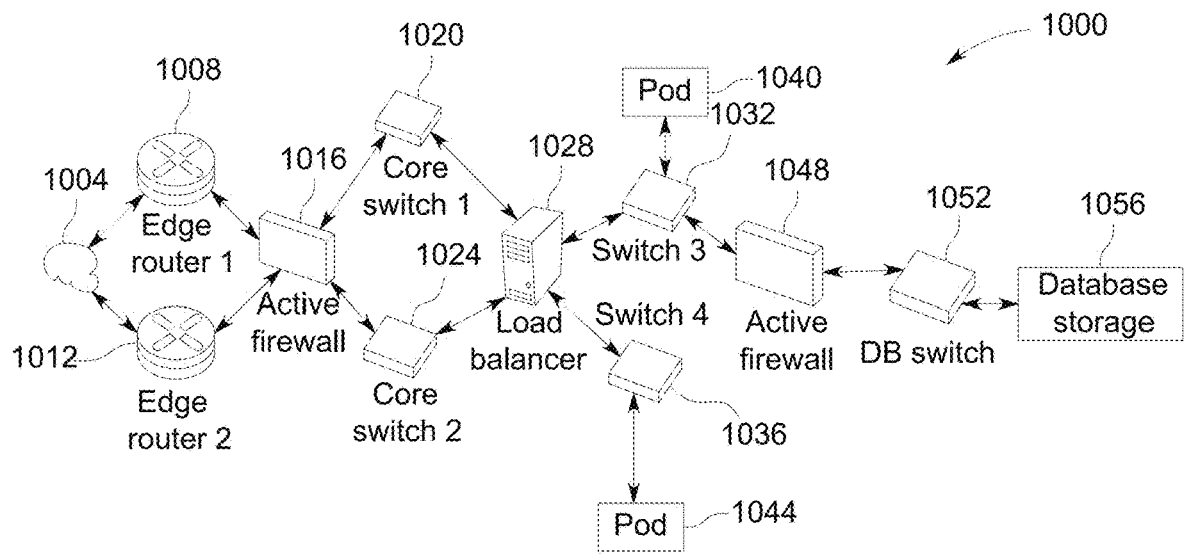
FIG. 10A shows a system diagram illustrating architectural components of an applicable environment, in accordance with some implementations.

FIG. 10A shows a system diagram illustrating architectural components of an on-demand service environment 1000, in accordance with some implementations. For instance, the on-demand service environment 1000 may correspond to an implementation of computing environment 100 in FIG. 1. A client machine located in the cloud 1004 (or Internet) may communicate with the on-demand service environment via one or more edge routers 1008 and 1012. The edge routers may communicate with one or more core switches 1020 and 1024 via firewall 1016. The core switches may communicate with a load balancer 1028, which may distribute server load over different pods, such as pods 1040 and 1044. The pods 1040 and 1044, which may each include one or more servers and/or other computing resources, may perform data processing and other operations used to provide on-demand services. Communication with the pods may be conducted via pod switches 1032 and 1036. Components of the on-demand service environment may communicate with a database storage system 1056 via a database firewall 1048 and a database switch 1052.

Figure 10B:
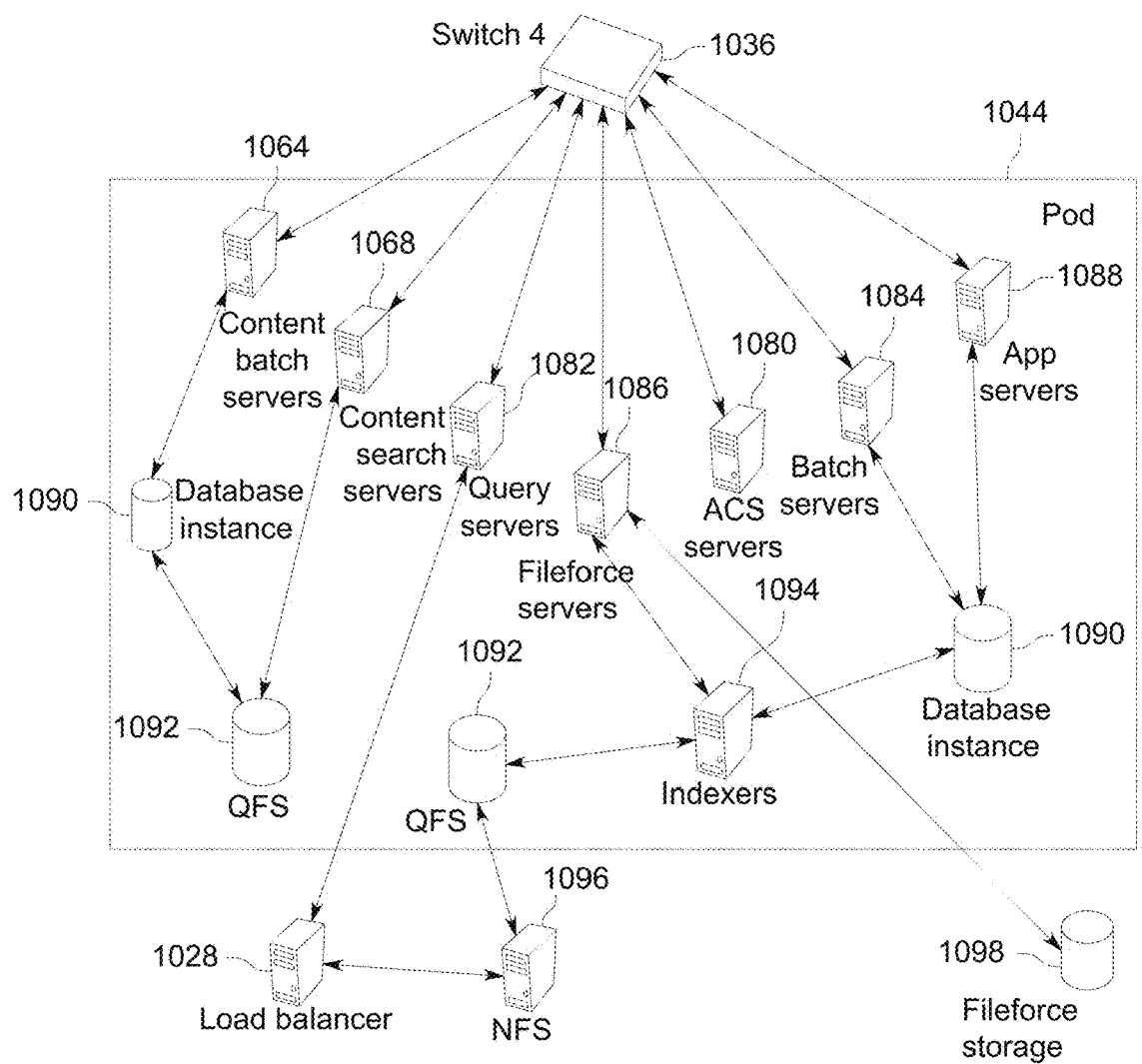
FIG. 10B shows a system diagram further illustrating architectural components of an applicable environment, in accordance with some implementations.

As shown in FIGS. 10A and 10B, accessing an on-demand service environment may involve communications transmitted among a variety of different hardware and/or software components. Further, the on-demand service environment 1000 is a simplified representation of an actual on-demand service environment. For example, while only one or two devices of each type are shown in FIGS. 10A and 10B, some implementations of an on-demand service environment may include anywhere from one to many devices of each type. Also, the on-demand service environment need not include each device shown in FIGS. 10A and 10B or may include additional devices not shown in FIGS. 10A and 10B.

Moreover, one or more of the devices in the on-demand service environment 1000 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1004 is intended to refer to a data network or plurality of data networks, often including the Internet. Client machines located in the cloud 1004 may communicate with the on-demand service environment to access services provided by the on-demand service environment. For example, client machines may access the on-demand service environment to retrieve, store, edit, and/or process information.

In some implementations, the edge routers 1008 and 1012 route packets between the cloud 1004 and other components of the on-demand service environment 1000. The edge routers 1008 and 1012 may employ the Border Gateway Protocol (BGP). The BGP is the core routing protocol of the Internet. The edge routers 1008 and 1012 may maintain a table of IP networks or 'prefixes' which designate network reachability among autonomous systems on the Internet.

In one or more implementations, the firewall 1016 may protect the inner components of the on-demand service environment 1000 from Internet traffic. The firewall 1016 may block, permit, or deny access to the inner components of the on-demand service environment 1000 based upon a set of rules and other criteria. The firewall 1016 may act as one or more of a packet filter, an application gateway, a stateful filter, a proxy server, or any other type of firewall.

In some implementations, the core switches 1020 and 1024 are high-capacity switches that transfer packets within the on-demand service environment 1000. The core switches 1020 and 1024 may be configured as network bridges that quickly route data between different components within the on-demand service environment. In some implementations, the use of two or more core switches 1020 and 1024 may provide redundancy and/or reduced latency.

In some implementations, the pods 1040 and 1044 may perform the core data processing and service functions provided by the on-demand service environment. Each pod may include various types of hardware and/or software computing resources. An example of the pod architecture is discussed in greater detail with reference to FIG. 10B.

In some implementations, communication between the pods 1040 and 1044 may be conducted via the pod switches 1032 and 1036. The pod switches 1032 and 1036 may facilitate communication between the pods 1040 and 1044 and client machines located in the cloud 1004, for example via core switches 1020 and 1024. Also, the pod switches 1032 and 1036 may facilitate communication between the pods 1040 and 1044 and the database storage 1056.

In some implementations, the load balancer 1028 may distribute workload between the pods 1040 and 1044. Balancing the on-demand service requests between the pods may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048. The database firewall 1048 may act as a computer application firewall operating at the database application layer of a protocol stack. The database firewall 1048 may protect the database storage 1056 from application attacks such as structure query language (SQL) injection, database rootkits, and unauthorized information disclosure.

In some implementations, the database firewall 1048 may include a host using one or more forms of reverse proxy services to proxy traffic before passing it to a gateway router. The database firewall 1048 may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, communication with the database storage system 1056 may be conducted via the database switch 1052. The multi-tenant database system 1056 may include more than one hardware and/or software components for handling database queries. Accordingly, the database switch 1052 may direct database queries transmitted by other components of the on-demand service environment (e.g., the pods 1040 and 1044) to the correct components within the database storage system 1056. In some implementations, the database storage system 1056 is an on-demand database system shared by many different organizations. The on-demand database system may employ a multi-tenant approach, a virtualized approach, or any other type of database approach. An on-demand database system is discussed in greater detail with reference to FIGS. 11 and 12.

FIG. 10B shows a system diagram illustrating the architecture of the pod 1044, in accordance with one implementation. The pod 1044 may be used to render services to a user of the on-demand service environment 1000. In some implementations, each pod may include a variety of servers and/or other systems. The pod 1044 includes one or more content batch servers 1064, content search servers 1068, query servers 1082, Fileforce servers 1086, access control system (ACS) servers 1080, batch servers 1084, and app servers 1088. Also, the pod 1044 includes database instances 1090, quick file systems (QFS) 1092, and indexers 1094. In one or more implementations, some or all communication between the servers in the pod 1044 may be transmitted via the switch 1036.

In some implementations, the application servers 1088 may include a hardware and/or software framework dedicated to the execution of procedures (e.g., programs, routines, scripts) for supporting the construction of applications provided by the on-demand service environment 1000 via the pod 1044. Some such procedures may include operations for providing the services described herein. The content batch servers 1064 may handle requests internal to the pod. These requests may be long-running and/or not tied to a particular customer. For example, the content batch servers 1064 may handle requests related to log mining, cleanup work, and maintenance tasks.

The content search servers 1068 may provide query and indexer functions. For example, the functions provided by the content search servers 1068 may allow users to search through content stored in the on-demand service environment. The Fileforce servers 1086 may manage requests for information stored in the Fileforce storage 1098. The Fileforce storage 1098 may store information such as documents, images, and basic large objects (BLOBs). By managing requests for information using the Fileforce servers 1086, the image footprint on the database may be reduced.

The query servers 1082 may be used to retrieve information from one or more file systems. For example, the query system 872 may receive requests for information from the app servers 1088 and then transmit information queries to network file systems (NFS) 1096 located outside the pod. The pod 1044 may share a database instance 1090 configured as a multi-tenant environment in which different organizations share access to the same database. Additionally, services rendered by the pod 1044 may require various hardware and/or software resources. In some implementations, the ACS servers 1080 may control access to data, hardware resources, or software resources.

In some implementations, the batch servers 1084 may process batch jobs, which are used to run tasks at specified times. Thus, the batch servers 1084 may transmit instructions to other servers, such as the app servers 1088, to trigger the batch jobs. For some implementations, the QFS 1092 may be an open source file system available from Sun Microsystems® of Santa Clara, California. The QFS may serve as a rapid-access file system for storing and accessing information available within the pod 1044. The QFS 1092 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1068 and/or indexers 1094 to identify, retrieve, move, and/or update data stored in the NFS 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information to access files over a network in a manner similar to how local storage is accessed. In some implementations, queries from the query servers 1082 may be transmitted to the NFS 1096 via the load balancer 1028, which may distribute resource requests over various resources available in the on-demand service environment. The NFS 1096 may also communicate with the QFS 1092 to update the information stored on the NFS 1096 and/or to provide information to the QFS 1092 for use by servers located within the pod 1044.

In some implementations, the pod may include one or more database instances 1090. The database instance 1090 may transmit information to the QFS 1092. When information is transmitted to the QFS, it may be available for use by servers within the pod 1044 without requiring an additional database call. In some implementations, database information may be transmitted to the indexer 1094. Indexer 1094 may provide an index of information available in the database 1090 and/or QFS 1092. The index information may be provided to Fileforce servers 1086 and/or the QFS 1092.

Figure 11:
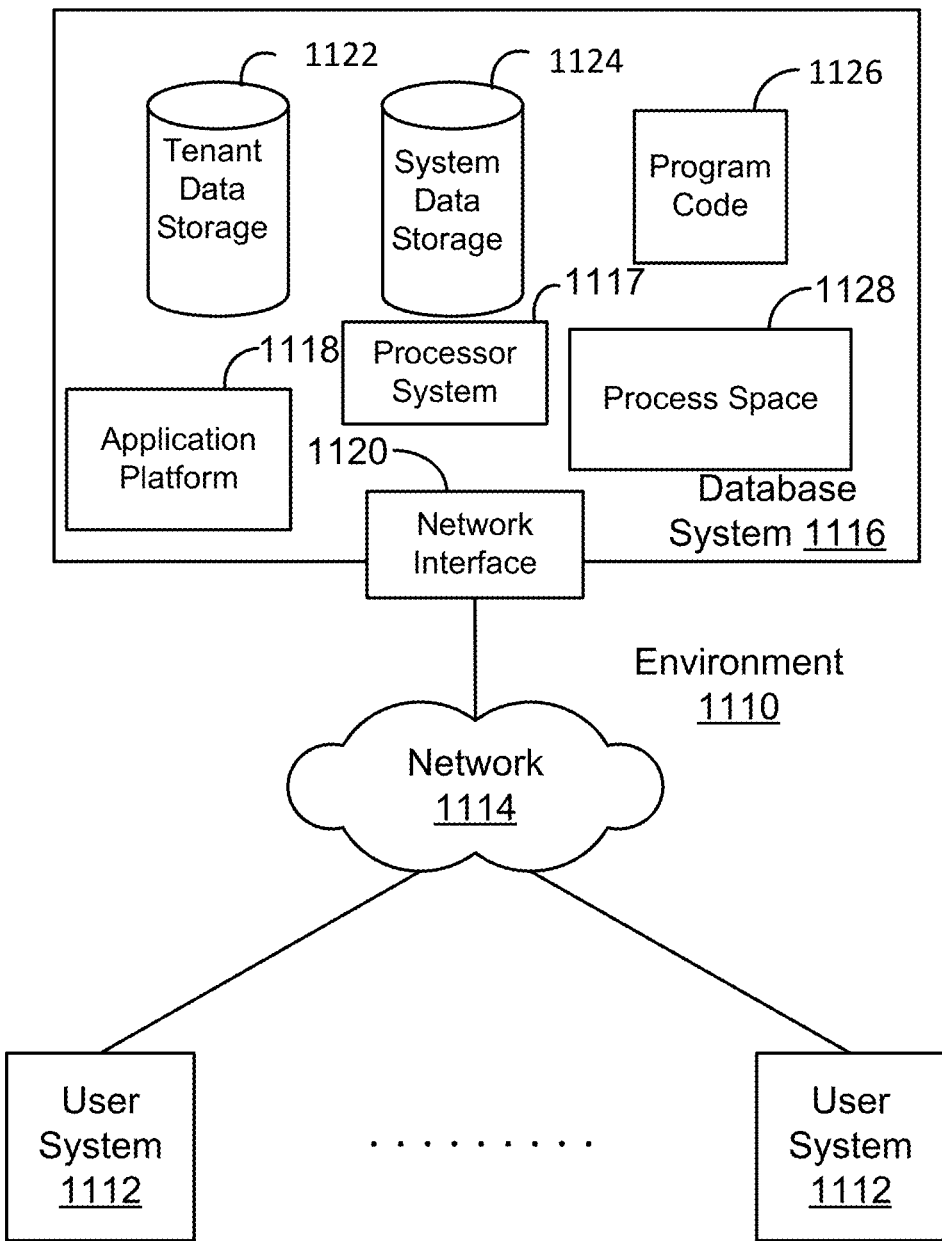
FIG. 11 shows a system diagram illustrating the architecture of a multi-tenant database environment, in accordance with some implementations.
Figure 12:
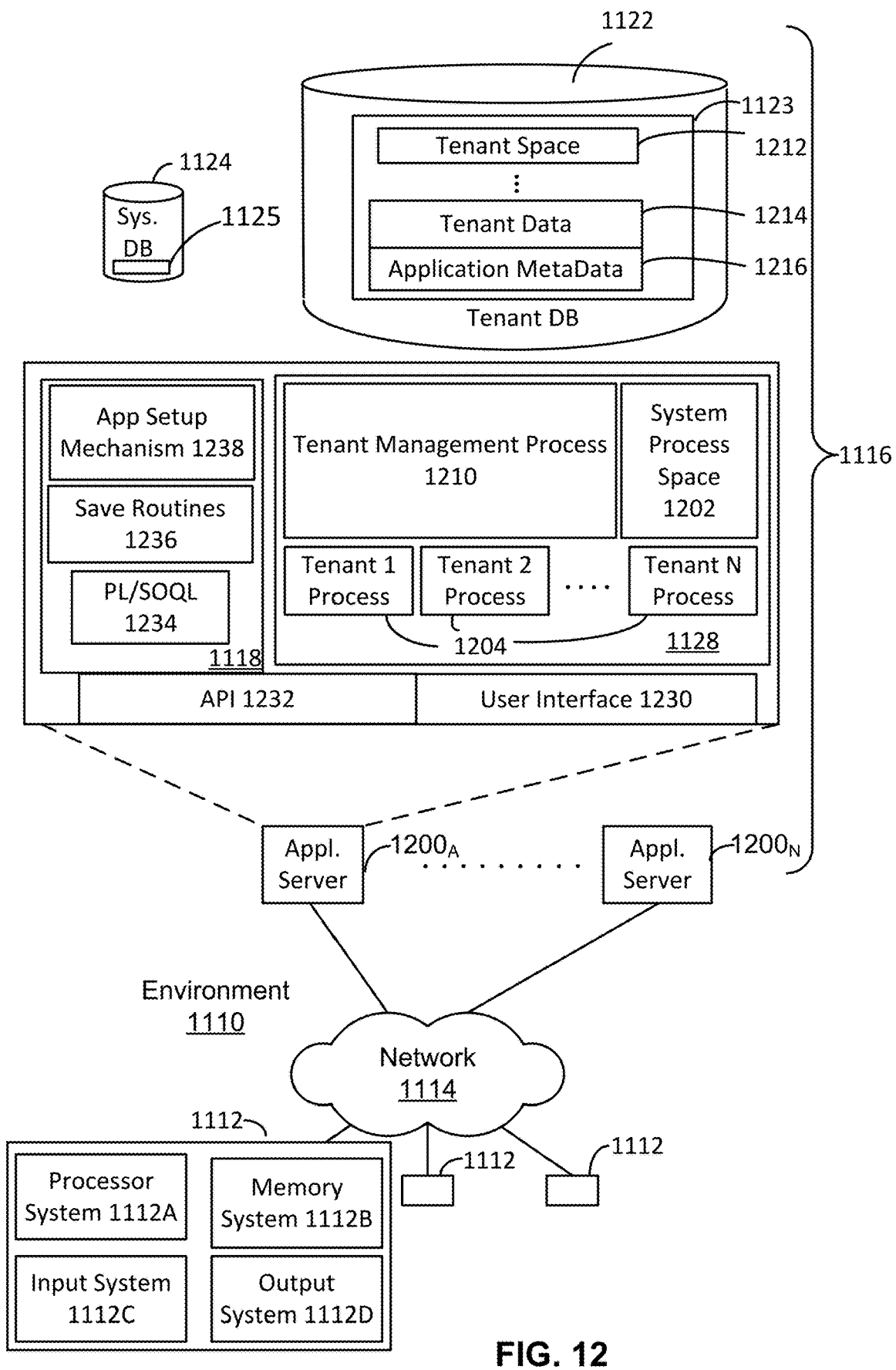
FIG. 12 shows a system diagram further illustrating the architecture of a multi-tenant database environment, in accordance with some implementations.

FIG. 11 shows a block diagram of an environment 1110 wherein an on-demand database service might be used, in accordance with some implementations. Environment 1110 includes an on-demand database service 1116. User system 1112 may be any machine or system that is used by a user to access a database user system. For example, any of user systems 1112 can be a handheld computing system, a mobile phone, a laptop computer, a workstation, and/or a network of computing systems. As illustrated in FIGS. 11 and 12, user systems 1112 might interact via a network 1114 with the on-demand database service 1116.

An on-demand database service, such as system 1116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1116" and "system 1116" will be used interchangeably herein. A database image may include one or more database objects. A relational database management system (RDBMS) or the equivalent may execute storage and retrieval of information against the database object(s). Application platform 1118 may be a framework that allows the applications of system 1116 to run, such as the hardware and/or software, e.g., the operating system. In an implementation, on-demand database service 1116 may include an application platform 1118 that enables creation, managing and executing one or more applications developed by the provider of the on-demand database service, users accessing the on-demand database service via user systems 1112, or third party application developers accessing the on-demand database service via user systems 1112.

One arrangement for elements of system 1116 is shown in FIG. 11, including a network interface 1120, application platform 1118, tenant data storage 1122 for tenant data 1123, system data storage 1124 for system data 1125 accessible to system 1116 and possibly multiple tenants, program code 1126 for implementing various functions of system 1116, and a process space 1128 for executing MTS system processes and tenant-specific processes, such as running applications as part of an application hosting service. Additional processes that may execute on system 1116 include database indexing processes.

The users of user systems 1112 may differ in their respective capacities, and the capacity of a particular user system 1112 might be entirely determined by permissions (permission levels) for the current user. For example, where a call center agent is using a particular user system 1112 to interact with system 1116, the user system 1112 has the capacities allotted to that call center agent. However, while an administrator is using that user system to interact with system 1116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1114 is any network or combination of networks of devices that communicate with one another. For example, network 1114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 1112 might communicate with system 1116 using TCP/IP and, at a higher network level, use other common Internet protocols to communicate, such as HTTP, FTP, AFS, WAP, etc. In an example where HTTP is used, user system 1112 might include an HTTP client commonly referred to as a "browser" for sending and receiving HTTP messages to and from an HTTP server at system 1116. Such an HTTP server might be implemented as the sole network interface between system 1116 and network 1114, but other techniques might be used as well or instead. In some implementations, the interface between system 1116 and network 1114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 1116, shown in FIG. 11, implements a web-based customer relationship management (CRM) system. For example, in some implementations, system 1116 includes application servers configured to implement and execute CRM software applications as well as provide related data, code, forms, webpages and other information to and from user systems 1112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 1116 implements applications other than, or in addition to, a CRM application. For example, system 1116 may provide tenant access to multiple hosted (standard and custom) applications. User (or third party developer) applications, which may or may not include CRM, may be supported by the application platform 1118, which manages creation, storage of the applications into one or more database objects and executing of the applications in a virtual machine in the process space of the system 1116.

Each user system 1112 could include a desktop personal computer, workstation, laptop, PDA, cell phone, or any wireless access protocol (WAP) enabled device or any other computing system capable of interfacing directly or indirectly to the Internet or other network connection. User system 1112 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1112 to access, process and view information, pages and applications available to it from system 1116 over network 1114.

Each user system 1112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1116 or other systems or servers. For example, the user interface device can be used to access data and applications hosted by system 1116, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 1112 and all of its components are operator configurable using applications, such as a browser, including computer code run using a central processing unit such as an Intel Pentium® processor or the like. Similarly, system 1116 (and additional instances of an MTS, where more than one is present) and all of their components might be operator configurable using application(s) including computer code to run using a central processing unit such as processor system 1117, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 1116 to intercommunicate and to process webpages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosy stems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VB Script, and many other programming languages as are well known may be used. (Java™ is a trademark of Sun Microsystems®, Inc.).

According to some implementations, each system 1116 is configured to provide webpages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 12 also shows a block diagram of environment 1110 further illustrating system 1116 and various interconnections, in accordance with some implementations. FIG. 12 shows that user system 1112 may include processor system 1112A, memory system 1112B, input system 1112C, and output system 1112D. FIG. 12 shows network 1114 and system 1116. FIG. 12 also shows that system 1116 may include tenant data storage 1122, tenant data 1123, system data storage 1124, system data 1125, User Interface (UI) 1230, Application Program Interface (API) 1232, PL/SOQL 1234, save routines 1236, application setup mechanism 1238, applications servers 1200A-1200N, system process space 1202, tenant process spaces 1204, tenant management process space 1210, tenant storage area 1212, user storage 1214, and application metadata 1216. In other implementations, environment 1110 may not have the same elements as those listed above and/or may have other elements instead of, or in addition to, those listed above.

User system 1112, network 1114, system 1116, tenant data storage 1122, and system data storage 1124 were discussed above in FIG. 11. Regarding user system 1112, processor system 1112A may be any combination of processors. Memory system 1112B may be any combination of one or more memory devices, short term, and/or long term memory. Input system 1112C may be any combination of input devices, such as keyboards, mice, trackballs, scanners, cameras, and/or interfaces to networks. Output system 1112D may be any combination of output devices, such as monitors, printers, and/or interfaces to networks. As shown by FIG. 12, system 1116 may include a network interface 1120 (of FIG. 11) implemented as a set of HTTP application servers 1200, an application platform 1118, tenant data storage 1122, and system data storage 1124. Also shown is system process space 1202, including individual tenant process spaces 1204 and a tenant management process space 1210. Each application server 1200 may be configured to tenant data storage 1122 and the tenant data 1123 therein, and system data storage 1124 and the system data 1125 therein to serve requests of user systems 1112. The tenant data 1123 might be divided into individual tenant storage areas 1212, which can be either a physical arrangement and/or a logical arrangement of data. Within each tenant storage area 1212, user storage 1214 and application metadata 1216 might be similarly allocated for each user. For example, a copy of a user's most recently used (MRU) items might be stored to user storage 1214. Similarly, a copy of MRU items for an entire organization that is a tenant might be stored to tenant storage area 1212. A UI 1230 provides a user interface and an API 1232 provides an application programmer interface to system 1116 resident processes to users and/or developers at user systems 1112. The tenant data and the system data may be stored in various databases, such as Oracle™ databases.

Application platform 1118 includes an application setup mechanism 1238 that supports application developers' creation and management of applications, which may be saved as metadata into tenant data storage 1122 by save routines 1236 for execution by subscribers as tenant process spaces 1204 managed by tenant management process 1210 for example. Invocations to such applications may be coded using PL/SOQL 1234 that provides a programming language style interface extension to API 1232. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1216 for the subscriber making the invocation and executing the metadata as an application in a virtual machine.

Each application server 1200 may be communicably coupled to database systems, e.g., having access to system data 1125 and tenant data 1123, via a different network connection. For example, one application server 1200 might be coupled via the network 1114 (e.g., the Internet), another application server 1200 might be coupled via a direct network link, and another application server 1200 might be coupled by yet a different network connection. Transfer Control Protocol and Internet Protocol (TCP/IP) are typical protocols for communicating between application servers 1200 and the database system. However, other transport protocols may be used to optimize the system depending on the network interconnect used.

In certain implementations, each application server 1200 is configured to handle requests for any user associated with any organization that is a tenant. Because it is desirable to be able to add and remove application servers from the server pool at any time for any reason, there is preferably no server affinity for a user and/or organization to a specific application server 1200. In some implementations, therefore, an interface system implementing a load balancing function (e.g., an F5 Big-IP load balancer) is communicably coupled between the application servers 1200 and the user systems 1112 to distribute requests to the application servers 1200. In some implementations, the load balancer uses a least connections algorithm to route user requests to the application servers 1200. Other examples of load balancing algorithms, such as round robin and observed response time, also can be used. For example, in certain implementations, three consecutive requests from the same user could hit three different application servers 1200, and three requests from different users could hit the same application server 1200. In this manner, system 1116 is multi-tenant, wherein system 1116 handles storage of, and access to, different objects, data and applications across disparate users and organizations.

As an example of storage, one tenant might be a company that employs a sales force where each call center agent uses system 1116 to manage their sales process. Thus, a user might maintain contact data, leads data, customer follow-up data, performance data, goals and progress data, etc., all applicable to that user's personal sales process (e.g., in tenant data storage 1122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1116 might also maintain system level data usable by multiple tenants or other data. Such system level data might include industry reports, news, postings, and the like that are sharable among tenants.

In certain implementations, user systems 1112 (which may be client machines/systems) communicate with application servers 1200 to request and update system-level and tenant-level data from system 1116 that may require sending one or more queries to tenant data storage 1122 and/or system data storage 1124. System 1116 (e.g., an application server 1200 in system 1116) automatically generates one or more SQL statements (e.g., SQL queries) that are designed to access the desired information. System data storage 1124 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method comprising:
providing, by a computer system, access to a first color scheme and a second color scheme through a user interface of a software application, wherein the first color scheme and the second color scheme each include a foreground color paired with a background color that contrasts the foreground color, and wherein at least one of the foreground color of the first color scheme or the background color of the first color scheme differs from that of the second color scheme;
assigning, by the computer system, the first color scheme to a first section of a webpage based on input at the user interface;
assigning, by the computer system, the second color scheme to a second section of the webpage based on further input at the user interface, wherein the second section is to be displayed as a subsection of the first section; and
generating, by the computer system after assigning the first color scheme and the second color scheme, source code representing the webpage, wherein due to the second section being a subsection of the first section, the source code includes a first container corresponding to the first section and a second container nested within the first container, the first container comprising properties corresponding to the first color scheme, and the second container comprising properties corresponding to the second color scheme.

2. The method of claim 1, wherein the properties corresponding to the first color scheme and the properties corresponding to the second color scheme are Cascading Style Sheets (CSS) custom properties.

3. The method of claim 1, wherein the properties corresponding to the second color scheme comprise a property inherited from the first color scheme.

4. The method of claim 1, further comprising:
generating, by the computer system, multiple color pairings for the first container or the second container, each color pairing including a corresponding foreground color and a contrasting background color, wherein the multiple color pairings comprise:
a first color pairing having user-specified colors; and
a second color pairing having system-generated colors.

5. The method of claim 4, further comprising:
determining, by the computer system, a shade of a color in the second color pairing based on a shade of a color in the first color pairing.

6. The method of claim 4, wherein the second color pairing comprises a background color that contrasts a background color of the first color pairing.

7. The method of claim 4, further comprising:
updating, by the computer system, the second color pairing in response to a change in the first color pairing.

8. The method of claim 1, further comprising:
storing, by the computer system, the first color scheme and the second color scheme as metadata associated with the webpage, wherein the metadata comprises a corresponding key-value pair for each color, and wherein the generating of the source code comprises converting the metadata into the source code.

9. The method of claim 1, further comprising:
adding, by the computer system, a plugin component to the first section or the second section based on user input indicating a location on the webpage where the plugin component is to be placed, wherein the plugin component was created separately from the webpage, and wherein the plugin component is configured to adopt whichever color scheme is assigned to the section that the plugin component is added to.

10. A system comprising:
one or more processors; and
memory storing instructions that, when executed, cause the one or more processors to:
provide access to a first color scheme and a second color scheme through a user interface of a software application, wherein the first color scheme and the second color scheme each include a foreground color paired with a background color that contrasts the foreground color, and wherein at least one of the foreground color of the first color scheme or the background color of the first color scheme differs from that of the second color scheme;

assign the first color scheme to a first section of a webpage based on input at the user interface;

assign the second color scheme to a second section of the webpage based on further input at the user interface, wherein the second section is to be displayed as a subsection of the first section; and generate, after assigning the first color scheme and the second color scheme, source code representing the webpage, wherein due to the second section being a subsection of the first section, the source code includes a first container corresponding to the first section and a second container nested within the first container, the first container comprising properties corresponding to the first color scheme, and the second container comprising properties corresponding to the second color scheme.

11. The system of claim 10, wherein the properties corresponding to the first color scheme and the properties corresponding to the second color scheme are Cascading Style Sheets (CSS) custom properties.

12. The system of claim 10, wherein the properties corresponding to the second color scheme comprise a property inherited from the first color scheme.

13. The system of claim 10, wherein the instructions, when executed, further cause the one or more processors to:

generate multiple color pairings for the first container or the second container, each color pairing including a corresponding foreground color and a contrasting background color, wherein the multiple color pairings comprise:

a first color pairing having user-specified colors; and
a second color pairing having system-generated colors.

14. The system of claim 13, wherein the instructions, when executed, further cause the one or more processors to:

determine a shade of a color in the second color pairing based on a shade of a color in the first color pairing.

15. The system of claim 13, wherein the second color pairing comprises a background color that contrasts a background color of the first color pairing.

16. The system of claim 13, wherein the instructions, when executed, further cause the one or more processors to:

update the second color pairing in response to a change in the first color pairing.

17. The system of claim 13, wherein the multiple color pairings are generated for the first container, and wherein the second container is configured to inherit the second color pairing from the first container.

18. The system of claim 10, wherein the instructions, when executed, further cause the one or more processors to:

store the first color scheme and the second color scheme as metadata associated with the webpage, wherein the metadata comprises a corresponding key-value pair for each color, and wherein the one or more processors are configured to convert the metadata into the source code.

19. The system of claim 10, wherein the instructions, when executed, further cause the one or more processors to:

add a plugin component to the first section or the second section based on user input indicating a location on the webpage where the plugin component is to be placed, wherein the plugin component was created separately from the webpage, and wherein the plugin component is configured to adopt whichever color scheme is assigned to the section that the plugin component is added to.

20. A non-transitory computer-readable medium storing program code, the program code including instructions that are executable by one or more processors of a computer system to:

provide access to a first color scheme and a second color scheme through a user interface of a software application, wherein the first color scheme and the second color scheme each include a foreground color paired with a background color that contrasts the foreground color, and wherein at least one of the foreground color of the first color scheme or the background color of the first color scheme differs from that of the second color scheme;

assign the first color scheme to a first section of a webpage based on input at the user interface;

assign the second color scheme to a second section of the webpage based on further input at the user interface, wherein the second section is to be displayed as a subsection of the first section; and generate, after assigning the first color scheme and the second color scheme, source code representing the webpage, wherein due to the second section being a subsection of the first section, the source code includes a first container corresponding to the first section and a second container nested within the first container, the first container comprising properties corresponding to the first color scheme, and the second container comprising properties corresponding to the second color scheme.

\* \* \* \* \*